United States Patent
Weinhardt

(10) Patent No.: US 11,402,015 B2
(45) Date of Patent: *Aug. 2, 2022

(54) HYDRAULIC SYSTEM FOR AN AUTOMATIC TRANSMISSION OF A MOTOR VEHICLE

(71) Applicant: AUDI AG, Ingolstadt (DE)

(72) Inventor: Mathias Weinhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 854 days.

This patent is subject to a terminal disclaimer.

(21) Appl. No.: 16/322,717

(22) PCT Filed: Aug. 1, 2017

(86) PCT No.: PCT/EP2017/069453
§ 371 (c)(1),
(2) Date: Feb. 1, 2019

(87) PCT Pub. No.: WO2018/024734
PCT Pub. Date: Feb. 8, 2018

(65) Prior Publication Data
US 2021/0381591 A1 Dec. 9, 2021

(30) Foreign Application Priority Data
Aug. 3, 2016 (DE) ...................... 10 2016 214 367.0

(51) Int. Cl.
*F16H 61/12* (2010.01)
*F15B 1/04* (2006.01)
(Continued)

(52) U.S. Cl.
CPC ............... *F16H 61/12* (2013.01); *F15B 1/04* (2013.01); *F15B 13/0444* (2013.01);
(Continued)

(58) Field of Classification Search
CPC .... F16H 61/12; F16H 61/0021; F16H 61/688; F16H 2059/683; F16H 2061/0034;
(Continued)

(56) References Cited

U.S. PATENT DOCUMENTS

| 10,508,666 | B2 * | 12/2019 | Weinhardt | .............. F16H 61/12 |
| 2008/0006029 | A1 * | 1/2008 | Kitou | .................... F15B 19/005 |
| | | | | 60/459 |

(Continued)

FOREIGN PATENT DOCUMENTS

| CN | 104929991 A | 9/2015 |
| DE | 102 04 183 A1 | 8/2003 |

(Continued)

OTHER PUBLICATIONS

Chinese Office Action dated Oct. 23, 2020, in connection with corresponding CN Application No. 201780047785.X (7 pp., including machine-generated English translation).

(Continued)

*Primary Examiner* — Justin Holmes
(74) *Attorney, Agent, or Firm* — Maier & Maier, PLLC

(57) ABSTRACT

A hydraulic system for an automatic transmission of a motor vehicle, including a high pressure circuit in which a pressure accumulator, at least one clutch and a gear selector are connected, and comprising a low pressure circuit for cooling the clutch, wherein the high pressure circuit and the low pressure circuit have at least one hydraulic pump that can be driven by an electric motor, and including a control unit that actuates the electric motor of the hydraulic pump when a pressure accumulator charging requirement is detected, wherein the high and low pressure circuits are connected via a bypass line to an integrated accumulator charging valve.

13 Claims, 16 Drawing Sheets

(51) Int. Cl.
*F15B 13/044* (2006.01)
*F15B 19/00* (2006.01)
*F16H 61/00* (2006.01)
*F16H 61/688* (2006.01)
*F16H 59/68* (2006.01)

(52) U.S. Cl.
CPC ....... *F15B 19/005* (2013.01); *F16H 61/0021* (2013.01); *F15B 2201/51* (2013.01); *F16D 2300/0214* (2013.01); *F16H 61/688* (2013.01); *F16H 2059/683* (2013.01); *F16H 2061/0034* (2013.01); *F16H 2061/1212* (2013.01); *F16H 2061/1264* (2013.01)

(58) Field of Classification Search
CPC ..... F16H 2061/1212; F16H 2061/1264; F16H 2061/1208; F15B 1/04; F15B 13/0444; F15B 19/005; F15B 2201/51; F16D 2300/0214
See application file for complete search history.

(56) References Cited

U.S. PATENT DOCUMENTS

2015/0260279 A1 9/2015 Moorman et al.
2018/0283419 A1* 10/2018 Tachibanada ......... F16D 41/125

FOREIGN PATENT DOCUMENTS

| DE | 10 2011 100 809 A1 | 11/2012 |
| DE | 10 2013 003 894 A1 | 9/2014 |
| DE | 10 2013 008 740 A1 | 11/2014 |
| DE | 10 2014 003 083 A1 | 9/2015 |
| DE | 102015212601 A1 * | 1/2017 |
| EP | 1 860 349 A1 | 11/2007 |
| WO | 97/42435 A1 | 11/1997 |
| WO | 03/048614 A1 | 6/2003 |

OTHER PUBLICATIONS

Notification of Transmittal of Translation of the International Preliminary Report on Patentability dated Feb. 14, 2019, in connection with corresponding international Application No. PCT/EP2017/069453 (8 pgs.).
Office Action dated Dec. 26, 2019, in corresponding Chinese Application No. 201780047785.X; 16 pages.
Chinese Office Action dated Jul. 13, 2020, in connection with corresponding CN Application No. 201780047785.X (7 pp., including machine-generated English translation).
Examination Report dated Apr. 10, 2017 of corresponding German application No. 10 2016 214 367.0; 12 pages.
International Search Report and Written Opinion of the International Searching Authority dated Nov. 7, 2017 in corresponding International application No. PCT/EP2017/069453; 30 pages.

* cited by examiner

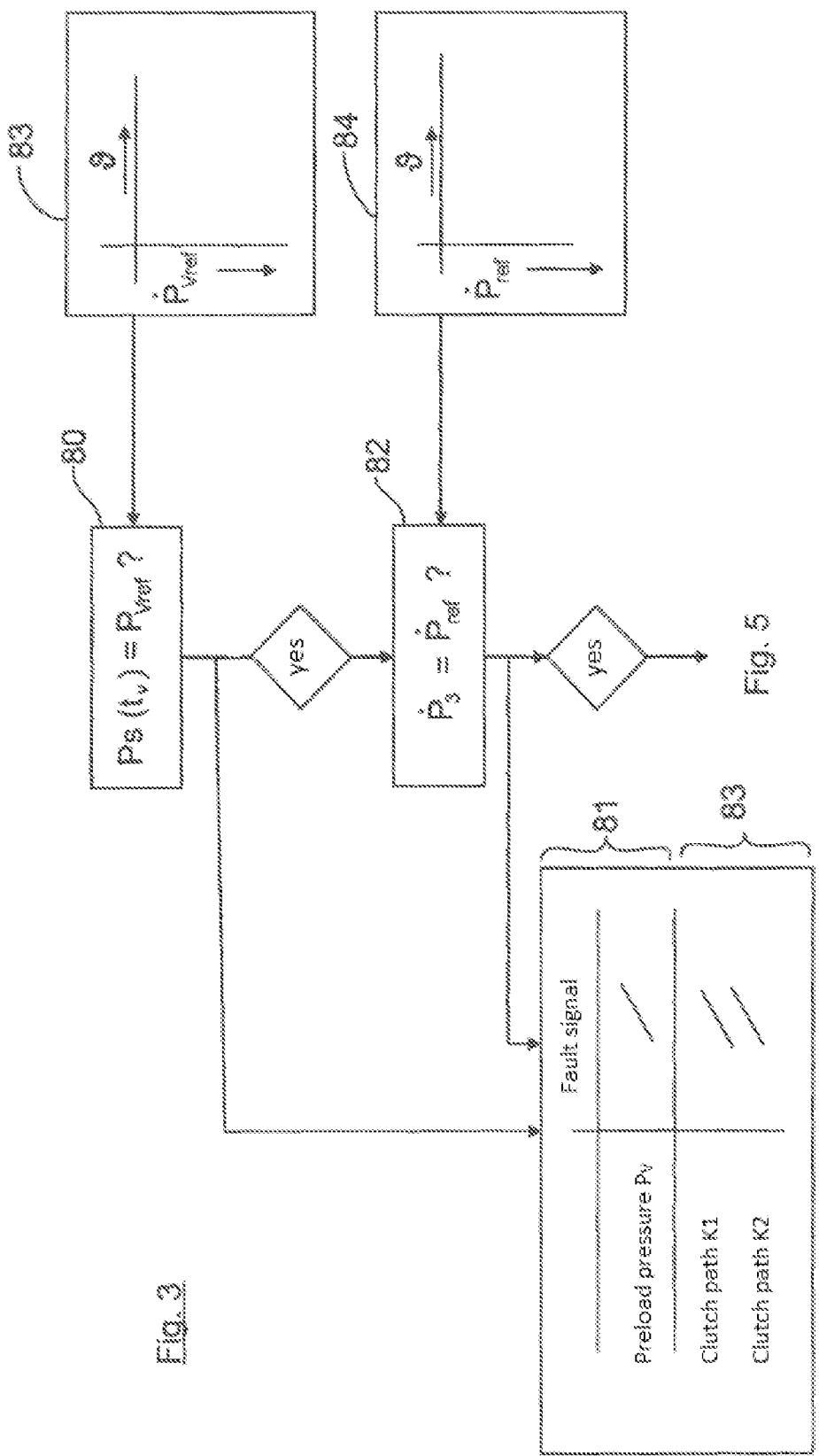

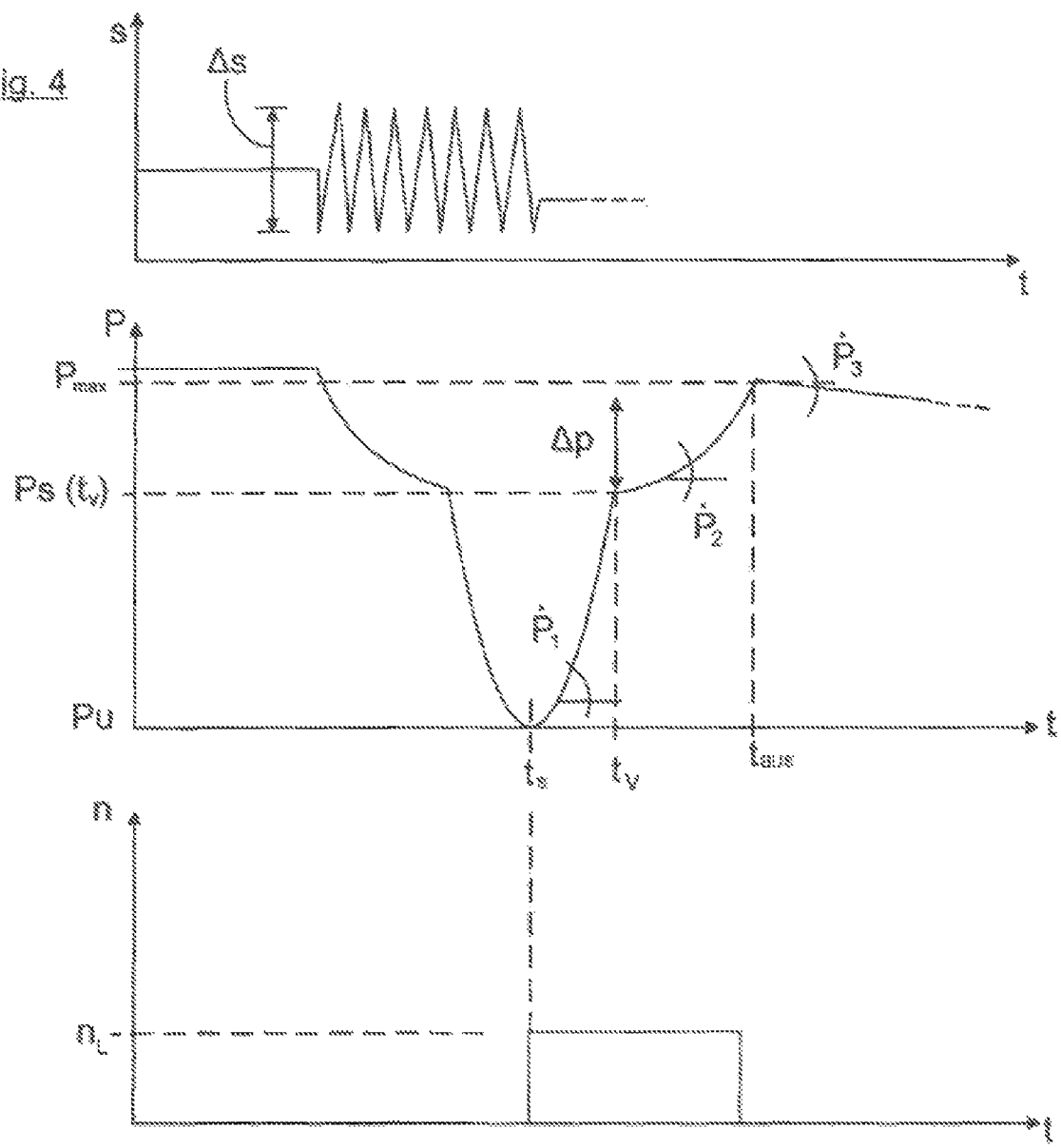

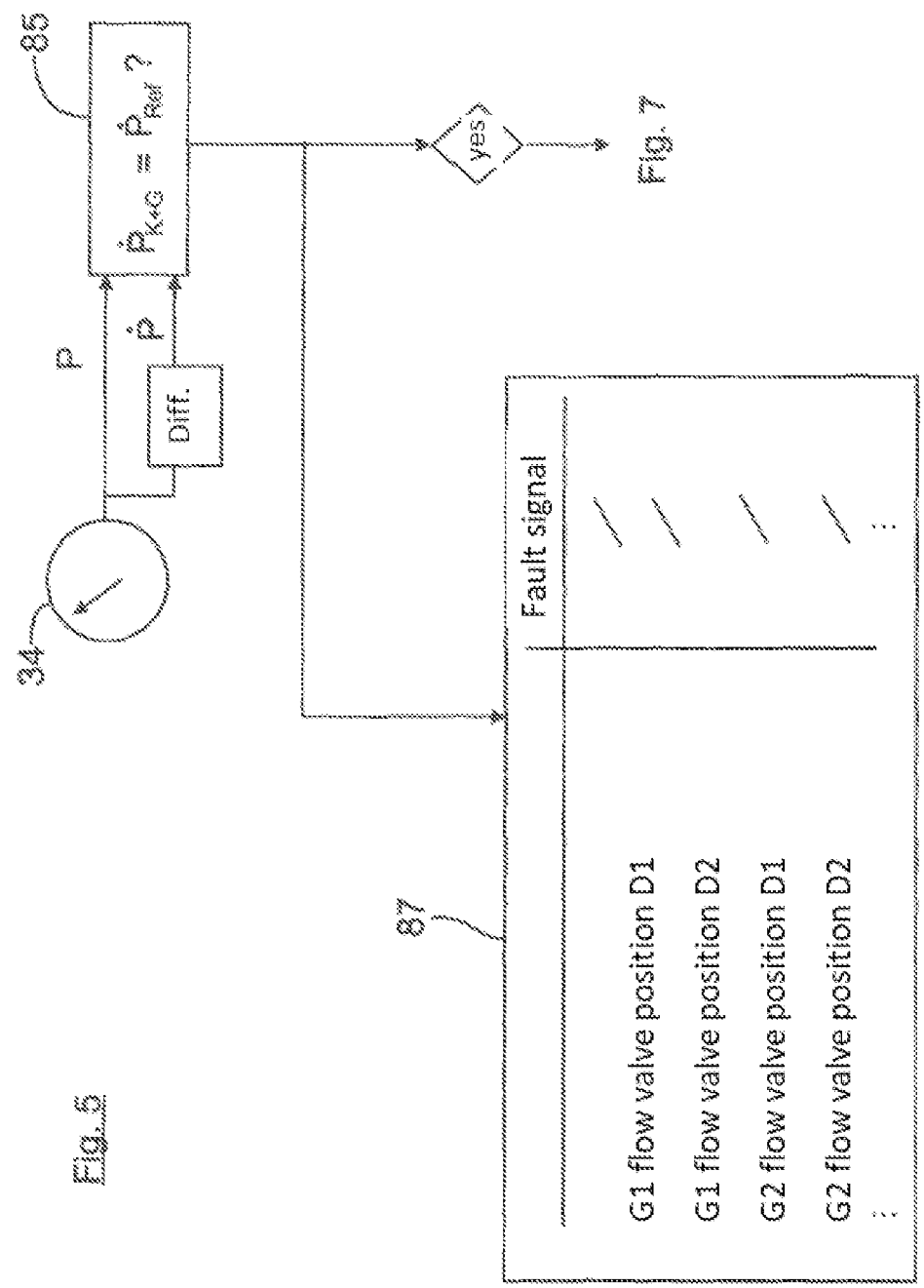

HYDRAULIC SYSTEM FOR AN AUTOMATIC TRANSMISSION OF A MOTOR VEHICLE

A hydraulic system for an automatic transmission, more particularly a dual-clutch transmission, of a motor vehicle.

In a dual-clutch transmission, two sub-transmissions enable fully automatic gear changes without any interruption of tractive power. Torque is transmitted via one of two clutches, which connects the two sub-transmissions to the drive. The clutches and the gear selectors for engaging the gears are actuated via hydraulic cylinders, which are controlled hydraulically via a hydraulic system.

From DE 10 2014 003 083 A1 a generic hydraulic system is known, which has a pressure accumulator for supplying an accumulator pressure in the hydraulic system. A control valve is arranged in a coupling path extending from the pressure accumulator to the clutch-hydraulic cylinder, which control valve may be actuated by an electronic control unit, and with which the hydraulic pressure applied to the clutch hydraulic cylinder may be adjusted. The control unit is preferably assigned a pressure sensor (DE 10 2013 003894 A1), with which the hydraulic pressure applied to the clutch hydraulic cylinder can be detected. In addition, the hydraulic system has a charging hydraulic pump, which delivers hydraulic fluid in the hydraulic system in one charging operation in order to increase the accumulator pressure.

The high-pressure and low-pressure circuits of the hydraulic system can be connected via a bypass line to an integrated accumulator charging valve.

In a non-charging position, the accumulator charging valve can connect the hydraulic pump with the low-pressure circuit in a fluidic fashion, while at the same time the hydraulic pump is decoupled from the high-pressure circuit. Conversely, in a charging position, the accumulator charging valve can fluidically connect the hydraulic pump to the high-pressure circuit, while at the same time the hydraulic pump is decoupled from the low-pressure circuit. The accumulator valve can switch automatically from the charging position to the non-charging position at a first switchover time, specifically when the accumulator pressure in the high-pressure circuit exceeds an upper pressure threshold value. Conversely, the accumulator charging valve can switch automatically from the non-charging position to the charging position at a second switchover time, when the accumulator pressure drops below a lower pressure threshold value.

In the prior art, complex sensor systems are required to detect a malfunction of the accumulator charging valve. Such a malfunction may occur, for example, when a spring in the spring-loaded accumulator charging valve breaks or when, for example due to soil deposits, the travel path of the accumulator charging valve is impeded. In that case, the risk exists that the accumulator charging valve may no longer switch between the charging position and the non-charging position at plausible lower/upper pressure threshold values. Highlighted as relevant parameters for the functioning of the accumulator charging valve are what is known as the valve spread, which is the difference in pressure between the upper and lower pressure threshold values, and the switchover times between the charging and non-charging positions.

Against this background and according to the characterizing part of claim 1, the control unit may have a diagnostic module for performing a switch-over time diagnosis in order to determine whether the actual accumulator pressure is in the range of the upper pressure threshold value at the first switchover time. Alternatively and/or additionally, it can be determined whether the actual accumulator pressure is within range of the lower pressure threshold value at the second switchover time. If the actual accumulator pressure detected at the first switchover time is found to deviate significantly from the upper pressure threshold value, a fault is diagnosed. Conversely, if the actual accumulator pressure detected at the second switchover time is found to deviate significantly from the lower pressure threshold value, this is likewise diagnosed as a fault.

In one technical implementation, the hydraulic system may have at least one clutch path extending from the accumulator to the clutch hydraulic cylinder In the clutch path, a clutch valve can be positioned, which can be controlled by the control unit and can be used to adjust the hydraulic pressure applied to the clutch hydraulic cylinder. The electronic control unit can be assigned a pressure sensor, which can detect the hydraulic pressure applied to the clutch hydraulic cylinder. In a simple technical implementation, the pressure sensor positioned in the clutch path can be used for detecting the actual accumulator pressure during the switchover timing diagnosis. During normal driving operation, the pressure sensor positioned in the clutch path performs a safety function, in which it monitors whether the clutch is depressurized or pressurized. During the switchover timing diagnosis, the clutch path pressure sensor can also be used in a dual function to detect the actual accumulator pressure.

In light of its above safety function during normal driving operation, the clutch path pressure sensor is designed as having a correspondingly small measuring range (in other words, as economical). The measuring range of the pressure sensor may therefore lie outside of, i.e. below, the upper pressure threshold value at which the accumulator charging valve switches automatically from its charging position to its non-charging position. In that case, the actual accumulator pressure therefore cannot be detected immediately by the clutch path pressure sensor at the first switchover time. It is therefore preferable for an analysis unit to estimate, on the basis of measured pressure values that are within the pressure sensor measuring range, a time frame within which the first switchover time and/or the second switchover time will lie if the accumulator charging valve is functioning properly. If the analysis unit determines that the first/second switchover time lies outside of this time frame, a fault will be diagnosed. The analysis unit may have an extrapolation component, for example, which extrapolates the aforementioned time frame based upon the aforementioned measured pressure values.

If no fault was detected during the switch-over diagnosis, a valve spread diagnosis may follow as a follow-up diagnosis, in which an actual valve spread between the lower and upper pressure threshold value is determined. The diagnostic module may have an analysis unit which compares the determined actual valve spread with a target valve spread. If a significant deviation is found, the analysis unit can diagnose a fault.

To determine the actual valve spread, the analysis unit can specify a diagnosis time interval, which begins at the first switchover time and ends at the second switchover time (i.e., during a non-charging operation). In the diagnosis time interval, an accumulator pressure decrease corresponding to the actual valve spread occurs as a result of actuation of a reference hydraulic cylinder and as a result of hydraulic system leakage. The procedure for determining this accumulator pressure decrease during the diagnosis time interval is preferably as follows: For example, the reference hydraulic cylinder has a position sensor, which detects the piston travel when actuating the gear selector. The diagnostic module can integrate the piston travel distances during the diagnostic time interval into an overall diagnostic path and calculate the pressure drop associated with the gear selector actuations. From the sum of the pressure decrease associated with the gear selector actuations plus the leakage-induced pressure decrease, the analysis unit can then determine the accumulator pressure decrease during the diagnosis time interval. The leakage-induced pressure decrease during the diagnosis time interval can be determined based upon previous diagnoses or leakage measurements.

The first and second switchover times during the change between the charging and non-charging positions can be determined as follows: The control unit may be assigned a current measuring device, with which an actual current consumption of the electric motor can be detected. The control unit can detect the switchover time from high current consumption to low current consumption as the first switchover time. Conversely, the control unit can detect the switchover time from low current consumption to high current consumption as the second switchover time.

In a preferred embodiment, the reference hydraulic cylinder can be a gear selector hydraulic cylinder that has been found during a preceding gear selector diagnosis to be fault-free. In a reference gear selector path extending from the pressure accumulator to the reference hydraulic cylinder, a control valve can be positioned, which can be actuated by the control unit and can be used to adjust the hydraulic pressure applied to the reference hydraulic cylinder.

The switchover timing diagnosis and/or the valve spread diagnosis are preferably performed as follow-on diagnoses that are preceded by a preload pressure and accumulator volume diagnosis in the pressure accumulator, a clutch path diagnosis, and a gear selector path diagnosis.

In that case, an accumulator volume diagnosis can preferably be carried out by means of the diagnostic module. In the storage volume diagnosis, the pressure accumulator is first filled completely with hydraulic fluid in a diagnostic charging operation. Subsequently, one of the gear-selector hydraulic cylinders is selected as the reference hydraulic cylinder by the diagnostic module. It is actuated during a diagnostic time interval, whereby hydraulic-fluid withdrawal takes place, which results in intermittent actuation of the reference hydraulic cylinder (i.e., displacement volume) and hydraulic system leakage. The reference hydraulic cylinder is actuated during the diagnosis time interval until an ambient pressure prevails in the hydraulic system due to the associated removal of hydraulic fluid. At ambient pressure, the oil chamber in the pressure accumulator is completely drained, i.e., the pressure piston is pressed with a preload force against a stop of the pressure accumulator.

The diagnostic module has an evaluation unit, which determines the above hydraulic fluid removal and compares it with a reference accumulator volume. If a significant deviation is found, an accumulator volume fault is diagnosed.

In one technical implementation, the reference hydraulic cylinder may be equipped with a position sensor, which detects the piston travel distances occurring in the reference hydraulic cylinder during gear selector actuations. During the accumulator volume diagnosis, the diagnostic module can integrate the piston travel distances to obtain a total travel distance, and then use this total to calculate the hydraulic fluid removal (i.e., the displacement volume) associated with the gear selector actuations.

In one simple embodiment variant, the existence of ambient pressure in the hydraulic system can be detected with the aid of the position sensor as follows: When the ambient pressure is reached in the hydraulic system, the reference hydraulic cylinder is no longer pressurized by an actuating pressure that leads to a piston displacement. The position sensor therefore detects that no further piston travel is occurring in the reference hydraulic cylinder. From this, the diagnostic module concludes that the ambient pressure has been reached and the diagnosis time interval has ended. In the above accumulator volume diagnosis, in addition to the removal of hydraulic fluid resulting from the actuation of the reference hydraulic cylinder (hereinafter referred to as displacement volume), the removal of hydraulic fluid associated with constant hydraulic system leakage must be considered. This can preferably already be stored in the diagnostic module from previous measurements and/or diagnoses.

In addition to the aforementioned reference gear selector path, the hydraulic system has at least one clutch path which extends from the pressure accumulator to the clutch hydraulic cylinder and wherein a clutch valve that can be controlled by the electronic control unit is positioned.

The clutch valve can be used to adjust the hydraulic pressure applied to the clutch hydraulic cylinder. The electronic control unit is also assigned a pressure sensor, which can detect the hydraulic pressure applied to the clutch hydraulic cylinder.

During the accumulator volume diagnosis, both the above-described clutch path and the reference gear selector path leading to the reference hydraulic cylinder can be pressurized with the actual accumulator pressure prevailing in the hydraulic system. The actual accumulator pressure profile can thereby be detected during the accumulator volume diagnosis in a metrologically simple manner. In addition, with this hydraulic system structure, the leakage behavior of the clutch path and of the reference gear selector path can be carried out using the pressure sensor located in the clutch path. In contrast to the reference hydraulic cylinder, which is located in the reference gear selector path, the hydraulic cylinders of the other gear selector paths are decoupled from the accumulator pressure, i.e., they are not pressurized with accumulator pressure.

The gear selector path diagnosis can preferably be carried out as a follow-on diagnosis following a preload pressure diagnosis. In that case, the accumulator volume diagnosis can be performed only under the condition that in the preceding gear selector path diagnosis, at least one non-malfunctioning gear selector has been identified, which can be used as a reference gear selector in the accumulator volume diagnosis.

It is possible for the aforementioned gear selector path diagnosis to be carried out using the diagnostic module, in which case the diagnostic module, using the pressure sensor located in the above at least one clutch path, checks the leakage behavior in the respective gear selector path. The gear selector path diagnosis can preferably be carried out as a follow-on diagnosis following the aforementioned clutch path diagnosis. The gear selector path diagnosis is preferably carried out solely under the condition that at least one clutch path with fault-free leakage is identified in a preceding clutch path diagnosis, which will be described later. In that case, the pressure sensor in the clutch path that is identified as fault-free (hereinafter referred to as the reference clutch path) is used for the subsequent gear selector path diagnosis.

For the gear selector path diagnosis, the diagnostic module opens the clutch valve located in the reference clutch path so that the pressure sensor located in the reference clutch path can detect an actual accumulator pressure profile. The diagnostic module also opens a pressure control valve located in a connecting line leading to the gear selectors, in order to establish a pressure connection between the pressure sensor located in the reference clutch path and the gear selector valve located in the gear selector path.

In a first diagnostic step, a diagnostic charging operation is performed, in which the actual accumulator pressure detected by the pressure sensor is increased to an upper threshold value, at which the hydraulic charge pump is switched off. Once the diagnostic charging operation is completed, a third analysis unit can detect a pressure gradient of the accumulator pressure profile via the pressure sensor, which it can compare with a reference pressure gradient and analyze whether a fault-free or a faulty pressure decrease (i.e., gear selector leakage) is present in the accumulator pressure profile.

In one technical implementation, the hydraulic system can comprise a plurality of gear selector paths connected to one another in parallel, in each of which a gear selector valve is located, which can be adjusted between a closed valve position and two flow-through valve positions. In such a configuration, the gear selector path diagnosis can be performed for each of the flow-through valve positions separately in the gear selector path to be tested, and analyzed to identify faults. In contrast, all the gear selector valves in the gear selector paths not being tested are switched to the closed valve position, in order to increase measuring accuracy in the gear selector path being tested.

The aforementioned detection of the pressure gradient in the accumulator pressure profile is carried out within a measuring time interval. The start time of said interval is preferably immediately after completion of the diagnostic charging operation. During measurement of the pressure gradient, the actual accumulator pressure at the start time and at the measurement end time of the measuring time interval is also detected. Based upon these two absolute pressure values, if a sufficiently large accumulator pressure differential between the start time and the end time exists, the diagnostic module can make a fault-free diagnosis.

The pressure accumulator of the hydraulic system can be structured as a piston-cylinder unit which has an oil chamber connected to the clutch path and a preloaded pressure piston, to which a preload pressure is applied. The preloading is achieved, for example, by a gas pressure or alternatively by a spring. When the oil chamber is completely drained, the pressure piston is pressed with a preload force against a mechanical stop in the pressure accumulator. In such a completely drained state, the clutch path is not pressurized. Rather, in this case ambient pressure prevails in the clutch path. In the prior art, complex sensor systems are required to detect a malfunction of the pressure accumulator, for example, a reduction in gas pressure due to gas leakage.

The gear selector path diagnosis can preferably be carried out as a follow-on diagnosis following a preload pressure diagnosis and/or a clutch path diagnosis.

In light of the above, the diagnostic module can preferably be used to check the preload pressure of the pressure accumulator. For this purpose, at least one or more reference values that represent a reference accumulator pressure profile over time during a charging process are stored in the diagnostic module. For the pressure accumulator diagnosis, a charging operation is performed, in which the clutch valve located in the clutch path is opened all the way, so that the pressure sensor can detect an actual accumulator pressure profile over time during the charging operation. To analyze the actual accumulator pressure profile over time, the diagnostic module has an analysis unit, with which a pressure accumulator fault can be diagnosed if a significant deviation is detected between the reference accumulator pressure profile and the actual accumulator pressure profile.

For the pressure accumulator diagnosis, the charging operation is performed at a constant charging speed of the hydraulic charge pump. The clutch path is thereby filled with hydraulic fluid, specifically until a preload pressure time at which the hydraulic pressure detected by the pressure sensor (i.e., the actual accumulator pressure) is as great as the (actual) preload pressure of the pressure accumulator. As the charging process continues, the oil chamber of the pressure accumulator is filled starting from the preload pressure time, specifically with displacement of the pressure piston and with a further increase in the actual accumulator pressure.

Such a charging process results in a characteristic time-charge curve. This curve can extend between a diagnosis start time, at which the pressure accumulator oil chamber is completely drained, and the aforementioned upper threshold value, and can be used for the pressure accumulator diagnosis as follows: The time-charge curve (i.e., the actual accumulator pressure profile) has a steep pressure gradient until the preload pressure time is reached, and has a dramatically reduced pressure gradient in comparison after the preload pressure time. If the pressure accumulator is functioning properly, the actual preload pressure detected at the preload pressure time will coincide with the structural interpretation of the pressure accumulator preload pressure which is stored in the diagnostic module, taking into account the strong temperature dependency.

In the analysis unit of the diagnostic module, the actual accumulator pressure detected by the pressure sensor at the preload pressure time is compared with the predefined reference preload pressure of the pressure accumulator. If a significant deviation between the two values is found, an implausible preload pressure in the pressure accumulator will be concluded.

As was already mentioned above, diagnosis is started under the diagnosis-starting condition that the oil chamber of the pressure accumulator is fully drained and an ambient pressure prevails in the hydraulic system. To achieve this diagnosis-starting condition, at least one hydraulic cylinder of the clutch and/or the gear selector is actuated in advance until, as a result of the removal of hydraulic fluid associated with the hydraulic cylinder actuation, the actual accumulator pressure detected by the pressure sensor is reduced to ambient pressure. In that case, the pressure accumulator oil chamber is also automatically completely drained.

To determine the preload pressure time, the analysis unit can analyze and compare the pressure gradients over time before and after the preload pressure time, and can use the result of this comparison to calculate the preload pressure time or to determine whether or not a pressure accumulator fault exists.

A dual-clutch transmission has two clutches, which are connected to the pressure accumulator via substantially identical clutch paths. In that case, the above-described pressure accumulator diagnosis can be carried out twice, specifically as part of a first partial diagnosis using the pressure sensor located in the first clutch path and with the clutch valve in the second clutch path closed, and as part of a second partial diagnosis using the pressure sensor located in the second clutch path and with the clutch valve in the first clutch path closed. In the analysis unit, the pressure accumulator diagnosis is verified by a comparison of the first and second partial diagnoses. If identical pressure accumulator faults are found in the first and the second partial diagnosis, the analysis unit will diagnose a pressure accumulator fault. In contrast, if different fault results are found in the two partial diagnoses, the analysis unit will diagnose a fault (i.e., a leak, for example) in one of the two clutch paths.

In a further embodiment, the diagnostic module can additionally carry out its own clutch path diagnosis, which follows the preload pressure diagnosis immediately as a follow-on diagnosis. For the clutch path diagnosis, the diagnostic charging operation carried out during the preload pressure diagnosis is continued until a maximum accumulator pressure (i.e., the upper threshold value) is reached, and is ended there at a switch-off time. When the charging operation has ended, the analysis unit compares the further actual accumulator pressure profile with stored reference values and analyzes whether a fault-free or a faulty, leakage-induced pressure drop is present in the accumulator pressure profile (detected by the pressure sensor). It is preferable for the above clutch path diagnosis to be performed only as long as a fault-free preload pressure in the pressure accumulator is ensured. Thus, the clutch path diagnosis can preferably be performed in the diagnostic module only if a fault-free pressure accumulator preload pressure exists during the preload pressure diagnosis.

The advantageous embodiments and/or refinements of the invention described above and/or reflected in the dependent claims may be used individually or in any desired combination with one another except, for example, in the case of clear dependencies or incompatible alternatives. In the following, the invention and its advantageous embodiments and refinements along with the advantages thereof will be described in greater detail with reference to the drawings.

BRIEF DESCRIPTION OF THE DRAWINGS

FIG. 3 is a block diagram showing the program blocks required for pressure accumulator and clutch path diagnosis in a diagnostic module; and FIG. 4 contains graphs illustrating the pressure accumulator and clutch path diagnosis;

FIG. 5 is a block diagram showing the program blocks required for gear selector path diagnosis in the diagnostic module;

DETAILED DESCRIPTION

Figure 1:
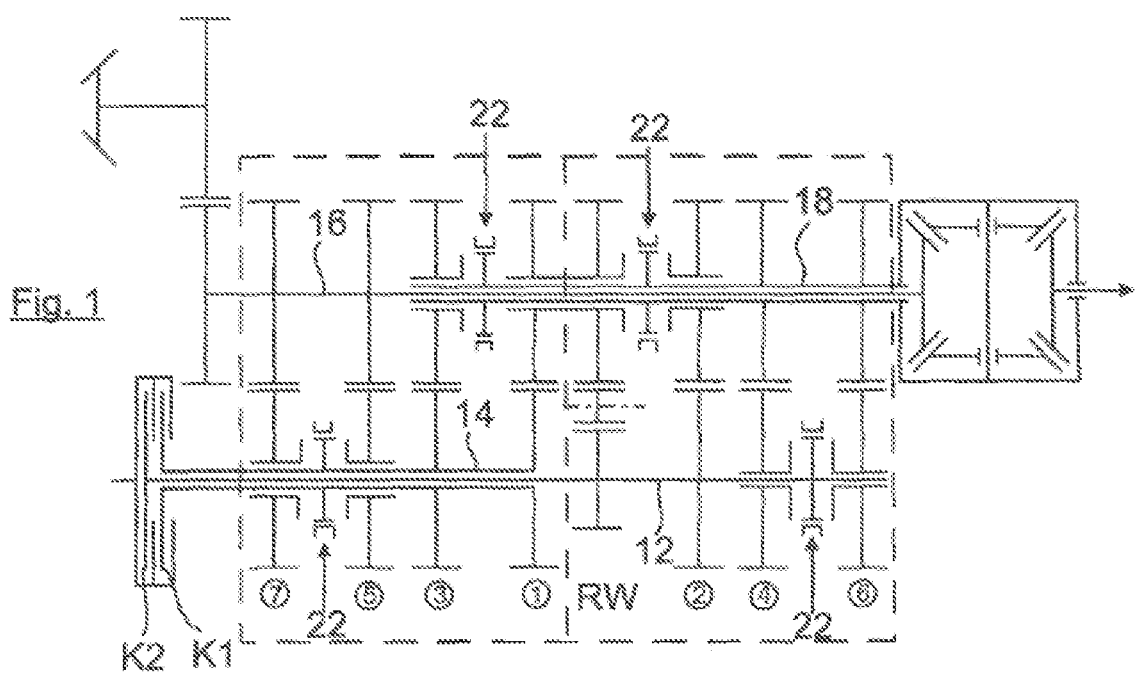
FIG. 1 is a block diagram of a dual-clutch transmission for a motor vehicle having seven forward gears and one reverse gear;5

FIG. 1 is a schematic diagram of a dual-clutch transmission for a motor vehicle with all-wheel drive. This dual-clutch transmission has seven forward gears (see circled numerals 1 through 7) and one reverse gear RW. In the following, the dual-clutch transmission will be described only insofar as is necessary for an understanding of the invention. The dual-clutch transmission has two input shafts 12, 14, which are arranged coaxially to one another and can be connected to the drive source, for example an internal combustion engine, alternatingly, via two hydraulically actuated multi-plate clutches K1, K2. Input shaft 14 is embodied as a hollow shaft, in which input shaft 12, embodied as a solid shaft, is guided. The two input shafts 12, 14 drive an axially parallel output shaft 16 and an intermediate shaft 18 embodied as a hollow shaft via gear sets of the forward gears and of the reverse gear. The gear sets of forward gears 1 through 7 each have fixed gears and movable gears that can be shifted via hydraulically actuated gear selectors. The gear selectors may be dual-synchronizer clutches, for example, each of which is capable of switching two neighboring movable gears from a neutral position. FIG. 2a shows the hydraulic system of the dual-clutch transmission in a highly simplified block diagram. The hydraulic cylinders 22, 23 of the clutches K1, K2 and of the gear selectors are actuated by means of the hydraulic system. The hydraulic system has a high-pressure circuit H and a low-pressure circuit N, as shown in FIG. 2a. In the high-pressure circuit H, the hydraulic cylinders 22, 23 of the clutches K1, K2 and the gear selector connected therein can be pressurized via a pressure accumulator 25 with an accumulator pressure of $p_s$ which can be in the order of, e.g., 30 bar. For this purpose, a main line 27 connected to the pressure accumulator 25 leads along clutch paths 30, 31 to the clutch hydraulic cylinders 23 and along gear selector paths 32 to the gear selector hydraulic cylinders 22. Clutch valves or gear selector valves 35, 38 are positioned in each of the gear selector paths and clutch paths 30, 31, 32. The clutch valves or gear selector valves 35, 38 are controllable in a manner not shown via a central control unit 39. In addition, the control unit 39 is in signal communication with pressure sensors 34. The pressure sensors 34 detect the hydraulic pressure applied to the first clutch K1 and to the second clutch K2.

The hydraulic system further comprises a charge pump 53, which is connected on the input side to an oil sump 55. The charge pump 53 can be activated by the control unit 39, via an electric motor 57, to charge the pressure accumulator 25. In addition, the charge pump 53 is arranged together with a cooling pump 59 on a common drive shaft 60, which is driven by the electric motor 57. The cooling pump 59 is connected on its output side to a low-pressure line 61, which leads to a distribution valve 63. When a requirement for cooling exists, the hydraulic fluid can be conducted to the first and/or to the second clutch K1, K2 and subsequently back into the oil sump 55, dependent upon the position of the distribution valve 63.

In FIG. 2a, the main line 27 of the high-pressure circuit H branches off at a branching-off point 65 into a bypass line 67, which is connected to the low-pressure line 61 of the low-pressure circuit N. Downstream of the branching-off point 65, a check valve 69 is positioned, which will be described later. Also integrated into the bypass line 67 is an accumulator charging valve 71. The accumulator charging valve 71 can be adjusted between the charging position L shown in FIG. 2a and a cooling position K, depending upon the level of the accumulator pressure $p_S$ in the high-pressure circuit H.

The accumulator pressure $p_S$ in the high-pressure circuit H acts as a control pressure, with which the accumulator charging valve 71 can be adjusted without additional external energy, i.e. automatically. The accumulator charging valve 71 is designed to move into the charging position L, for example when the accumulator pressure $p_S$ in the high-pressure circuit H falls below a lower threshold value, for example 25 bar. In addition, the accumulator charging valve 71 is automatically shifted into its cooling position K when the accumulator pressure $p_s$ exceeds an upper threshold value $p_{max}$, for example 28 bar.

Figure 11:
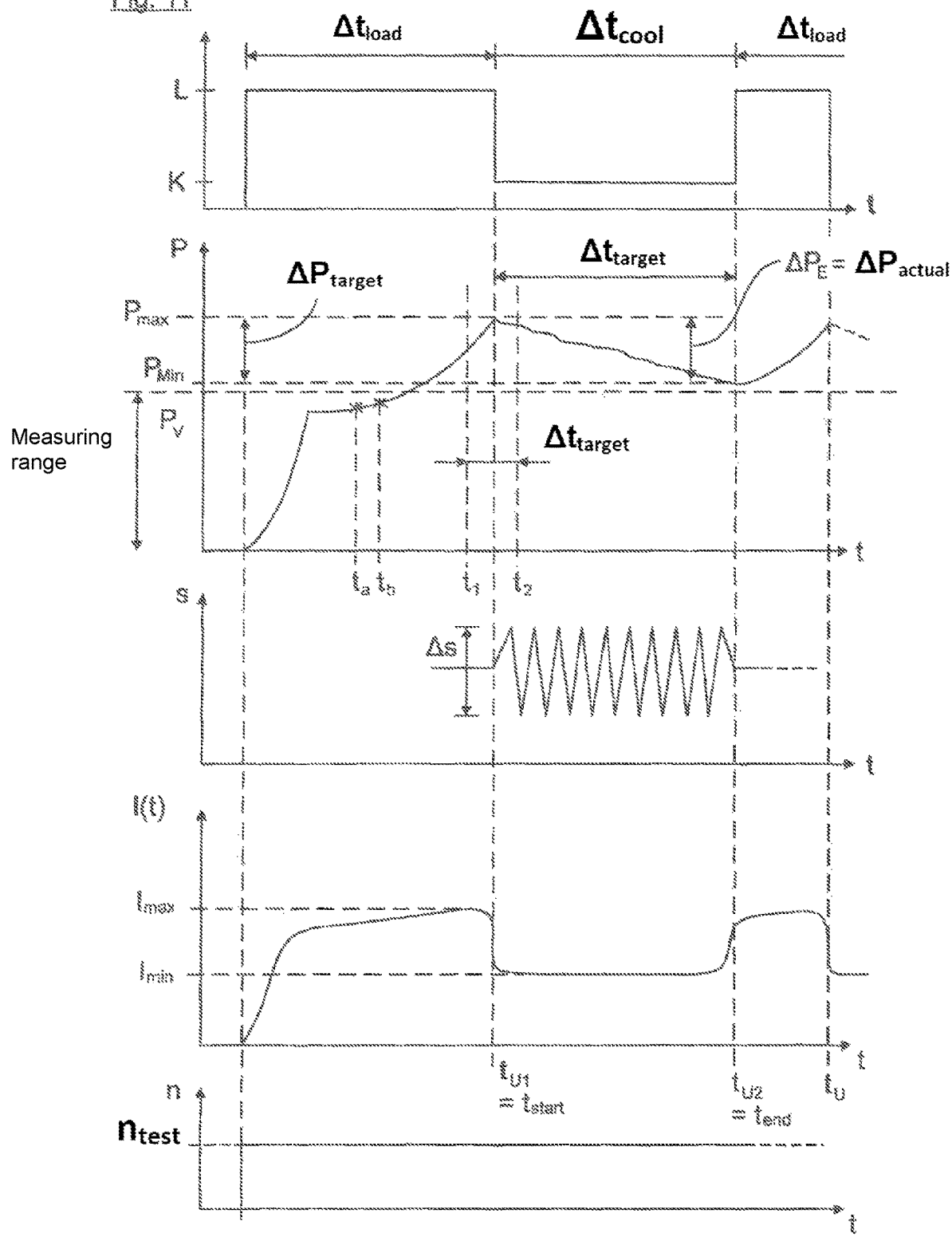
FIG. 11 contains graphs illustrating the profiles over time during switchover timing diagnosis and during valve spread diagnosis.

During driving operation, actuations of the clutches K1, K2 and of the gear selectors G1 to G4 result in pressure losses. In addition, further pressure losses occur due to basic leakage in the high-pressure circuit H, i.e. due to leakage resulting from valve gaps or the like. As a result, the accumulator pressure $p_S$ is reduced during driving operation. If the accumulator pressure $p_S$ should fall below the lower threshold value $p_{min}$ (i.e., if a requirement to charge the pressure accumulator exists), the accumulator charging valve 71 will automatically move to its charging position L (FIG. 2). Upon detection of the requirement to charge the pressure accumulator, the control unit 39 will activate the electric motor 57 to a target charging speed. This enables the hydraulic charge pump 53 to charge the pressure accumulator 25. In such a charging operation, the hydraulic charge pump 53 operates under a high pump load and therefore at a correspondingly high actual current consumption Imax (FIG. 11). When the accumulator pressure pS exceeds the upper threshold value $p_{max}$ (FIG. 11), i.e. when a requirement to charge the pressure accumulator no longer exists, the accumulator charging valve 71 automatically moves into its cooling position K. In the cooling position K, the hydraulic charge pump 53 delivers hydraulic oil via the now opened bypass line 67 into the low-pressure circuit N. At the same time, the high-pressure circuit H is closed in a pressure-tight manner via the check valve 69. Accordingly, the hydraulic charge pump 53 is no longer operating at a high pump load, but at a reduced pump load and also at a correspondingly reduced actual current consumption $I_{min}$ (FIG. 11).

As mentioned above, upon detection of a requirement to charge the pressure accumulator, the control unit 39 activates the electric motor 57 to a target charging speed. For detecting such a requirement to charge the pressure accumulator, a pressure sensor in the high-pressure circuit H and a position sensor in the accumulator charging valve 71 are dispensed with according to the invention. Instead, the control unit 39 is equipped with an analysis unit. The analysis unit is in signal communication with a current measuring device 75, which is integrated into the control of the motor and which detects the actual current consumption $I_{actual}$ of the electric motor 57, and with a speed sensor 77, which detects the actual rotational speed $n_{actual}$ of the electric motor 57.

Figure 2B:
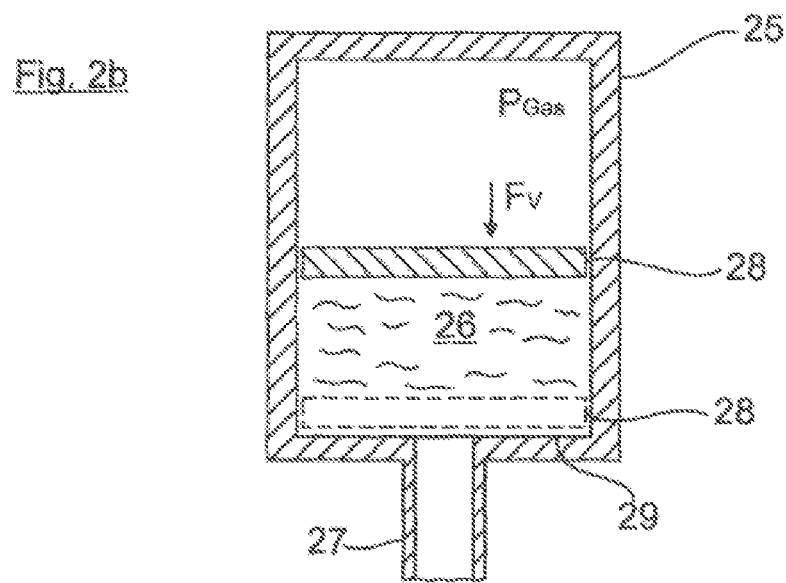
FIG. 2b shows a block diagram of a hydraulic system of a dual-clutch transmission and a rough schematic of the structure of a pressure accumulator.
Figure 2A:
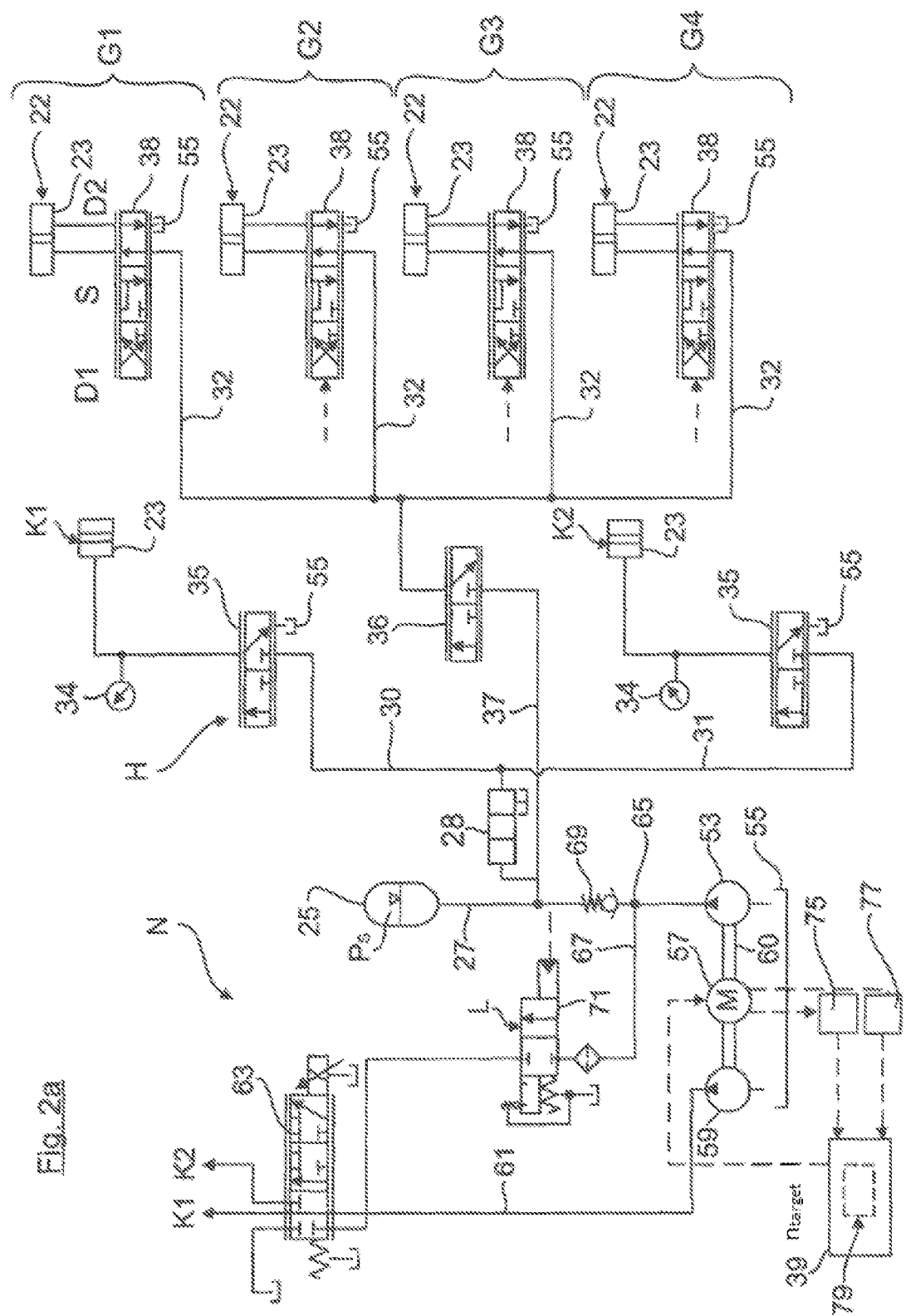
FIG. 2a shows a block diagram of a hydraulic system of a dual-clutch transmission and a rough schematic of the structure of a pressure accumulator.

FIG. 2b illustrates the basic structure and the functioning of the pressure accumulator 25. Accordingly, the pressure accumulator 25 is a piston-cylinder unit having an oil chamber 26, which is connected to the hydraulic lines 27, 31, 32, and a preloaded pressure piston 27. Preloading is achieved in this example by means of gas pressure applied to the pressure piston 27. Alternatively, preloading may be achieved by means of a spring. When the oil chamber 26 is completely drained, the pressure piston 27 (indicated in FIG. 2b by a dashed line) is pushed with a preload force $F_V$ against a stop 29 of the pressure accumulator 25. This means that during a filling operation, a hydraulic pressure which is greater than a preload pressure $p_V$ that correlates to the preload force $F_V$ prevails, to overcome the preload force $F_V$.

In FIG. 2b, the pressure accumulator 25 is shown in a partially filled state, in which the hydraulic oil is acting on the pressure piston 27 with an accumulator pressure, thereby building up the preload force $F_V$. In the completely drained state, the hydraulic lines 27, 31 are not pressurized by the pressure accumulator 25. Rather, ambient pressure $P_U$ prevails in the hydraulic lines 27, 31, 32. The automatic transmission is ready for operation when all the hydraulic lines 27, 31, 32 are filled with hydraulic oil and when the hydraulic pressure in the hydraulic lines 27, 31, 32 is greater than the preload pressure $p_V$, specifically by a preset pressure difference, so that the state of operational readiness will not be lost again due to basic leakage as soon as the charge pump 53 is switched off.

In FIG. 2a, the control unit 39 includes a diagnostic module 79 with which the charging behavior can be checked, more particularly, conditions can be checked to determine whether the actual preload pressure $p_V$ in the pressure accumulator 21 matches a reference preload pressure $p_{VRef}$ indicated in the specification (i.e. structurally specified). The program blocks required for this are outlined in FIG. 3. According to said figure, the diagnostic module 79 has an analysis unit 80, which compares a temperature-dependent preload pressure $p_{VRef}$ stored in a characteristic map 83 with an actual accumulator pressure $p_S(t_V)$ (FIG. 4), which will be described later. The actual accumulator pressure pS(tV) is detected by the pressure sensor 34 at a preload pressure time tV, which will be described later. During the diagnostic operation, the clutch valve 35 in one of the clutch paths 30, 31 is constantly open, while the clutch valve 35 in the other clutch path is closed.

If the pressure accumulator is functioning properly, the actual accumulator pressure $p_S(t_V)$ detected at the preload pressure time tV will match the reference preload pressure $p_{VRef}$. In contrast, if a significant preload pressure deviation exists, the analysis unit 80 will identify this as a preload pressure fault, which will be stored in a preload pressure fault memory 81 (FIG. 3). If it is determined that the pressure accumulator 25 is functioning properly, a further analysis unit 82 (FIG. 4) of the diagnostic module 79 will perform a clutch path diagnosis, which will be described later.

In the following, the pressure accumulator diagnosis (i.e., preload pressure diagnosis) and the clutch path diagnosis will be described in reference to FIGS. 3 and 4: To prepare for pressure accumulator diagnosis, the oil chamber 26 of the pressure accumulator 25 is drained completely and the actual accumulator pressure $p_S(t)$ in the hydraulic system is reduced to an ambient pressure $p_U$ so that the pressure accumulator diagnosis can begin at a diagnosis start time $t_S$ (FIG. 4). The above-described condition for the start of diagnosis is achieved by actuating the hydraulic cylinders 22, 23 of the clutches K1, K2 and the gear selectors G1 to G4, as indicated in the graph illustrating travel distance at the top of FIG. 4. Accordingly, the hydraulic cylinders 22, 23 are activated intermittently by supplying power to the respective clutch valves or gear selector valves 35, 38 until, due to the removal of hydraulic fluid associated with the hydraulic cylinder actuation, the accumulator pressure $p_S$ detected by the pressure sensor 34 is reduced to the ambient pressure $p_U$. The existence of such an ambient pressure $p_U$ can be detected by the pressure sensor 34. Alternatively, position sensors 93 in the hydraulic cylinders 22, 23 may be used to determine whether or not the respective hydraulic cylinder 22, 23 is still traveling a travel distance s (FIG. 4). If not, it will be concluded that an ambient pressure $p_U$ exists in the hydraulic system.

Diagnostic charging operation, in which the hydraulic charge pump 53 is operated at a constant charging speed $n_L$ (FIG. 4, lower graph), then begins at time $t_S$ (FIG. 4). First, for example, the pressure sensor 34 located in the first clutch path 31 detects the actual accumulator pressure profile $p_S(t)$, as represented in the middle graph in FIG. 4. As illustrated by said graph, the accumulator pressure $p_S$ increases until the preload pressure time $t_v$ at which the actual accumulator pressure $p_S(tv)$ detected by the pressure sensor 34 has reached the pressure accumulator preload pressure $p_V$.

As was stated above, if the pressure accumulator is functioning properly, the actual accumulator pressure $p_S(t_V)$ detected at the preload pressure time tV (accounting for temperature dependencies) will be identical to a reference preload pressure $p_{VRef}$. If the actual accumulator pressure $p_S(t_V)$ detected at the preload pressure time tv is found to deviate significantly from the reference preload pressure $p_{VRef}$, the analysis unit 80 will diagnose a preload pressure fault. As diagnostic charging operation continues, after the preload pressure time tV, the oil chamber 26 of the pressure accumulator 25 is filled, specifically by displacement of the pressure piston 27.

As is clear from the middle graph of FIG. 4, during diagnostic charging operation the actual accumulator pressure profile $p_S(t)$ rises with a steep pressure gradient $\dot{p}_1$ until the preload pressure $p_V$ is reached in the pressure accumulator 25 (i.e. up to the preload pressure time $t_V$). Afterward (i.e. after the preload pressure time $t_V$), in contrast, the actual accumulator pressure profile $p_S(t)$ rises with only a shallower pressure gradient $\dot{p}_2$. This characteristic charging curve for the pressure accumulator 25 is used as follows to determine the preload pressure time $t_2$: The analysis unit 80 detects the pressure gradients $\dot{p}_1$, $\dot{p}_2$ of the actual accumulator pressure profile $p_S(t)$. When a significant gradient change between the pressure gradients $\dot{p}_1$ and $\dot{p}_2$ is detected, the analysis unit 80 identifies this as the preload pressure time $t_V$.

If no preload pressure fault is detected in the above preload pressure diagnosis, this will be followed immediately by the clutch path diagnosis: For this purpose, the diagnostic charging operation carried out during the pressure accumulator diagnosis is simply continued until the pressure sensor 34 reaches an upper threshold value $p_{max}$ (FIG. 4, middle graph). In the middle graph of FIG. 4, the upper threshold value $p_{max}$ lies above the preload pressure pV of the pressure accumulator 25 by a pressure difference $\Delta p$. When the diagnostic charging operation is completed, a second analysis unit 82 compares a pressure gradient $\dot{p}_3$ of the actual accumulator pressure profile $p_S(t)$ with a reference pressure gradient $\dot{p}_{ref}$, which is stored on a temperature-dependent basis in a characteristic map 84 (FIG. 3) in the diagnostic module 79. Based upon this comparison, the analysis unit 82 determines whether a fault-free or a faulty leakage-induced pressure decrease is present in the actual accumulator pressure profile pS(t). It should be emphasized that the clutch path diagnosis is performed only if the analysis unit 80 does not detect a preload pressure fault. If the pressure accumulator 25 is fault-free, any faulty leakages can be unambiguously assigned to the clutch path 31. Both during the pressure accumulator diagnosis and during the clutch path diagnosis, the pressure control valve 36 located in the connecting line 37, which connects the main line 27 to the gear selector paths 32, is closed.

To validate the results obtained in the preload pressure/clutch path diagnosis, the diagnostic operation described above in reference to the first clutch path 31 can be performed twice, specifically as part of a first partial diagnosis A using the pressure sensor 34 located in the first clutch path 31 and with the clutch valve 35 in the second clutch path 32 closed. The above diagnostic operation can then be performed as part of a second partial diagnosis B, specifically with the pressure sensor 34 located in the second clutch path 30 and with the clutch valve 35 in the first clutch path 31 closed.

If the same fault is detected in both the first partial diagnosis A and the second partial diagnosis B, the diagnostic module 79 can diagnose a pressure accumulator fault, and can rule out a clutch path fault with high probability. If different fault results are obtained, the diagnostic module 79 can detect a leakage error in one of the two clutch paths 30, 31.

FIG. 5 is a highly simplified block diagram showing the program blocks of the diagnostic module 79 that are required for a gear selector path diagnosis. The gear selector path diagnosis is performed as a follow-on diagnosis immediately following the clutch path diagnosis (FIG. 3), and specifically under the condition that at least one clutch path 30, 31 is diagnosed as having fault-free leakage during the clutch path diagnosis. The pressure sensor 34 of the clutch path 30, 31 that is classified as fault-free (hereinafter referred to as the reference clutch path) is used for the gear selector path diagnosis illustrated in FIGS. 5 and 6.

As is clear from FIG. 5, the diagnostic module 79 has a third analysis unit 85, at the signal input of which an actual accumulator pressure $p_S(t)$ detected by the pressure sensor 34 and an actual accumulator pressure gradient $\dot{p}$ are applied. The analysis unit 85 checks the leakage behavior of each of the gear selector paths 32 separately. Any leakage faults that are detected are stored in the fault memory 87.

In the following, the gear selector path diagnosis will be described in reference to FIGS. 5 and 6: The diagnostic module 79 begins by opening the clutch valve 35 located in the reference clutch path 30, in order to detect the actual accumulator pressure profile $p_S(t)$. The pressure control valve 36 in the connecting line 37 of the hydraulic system is also opened, to establish a pressure connection between the pressure sensor 34 located in the reference clutch path 30 and the gear selector paths 32. A diagnostic charging operation is then performed by activating the hydraulic charge pump 53. During the diagnostic charging operation, the actual accumulator pressure pS(t) is increased up to the upper threshold value $p_{max}$ (FIG. 6) at the end time $t_{off}$. When the diagnostic charging operation has ended, i.e. at the end time $t_{off}$ (FIG. 6), the pressure sensor 34 detects a pressure gradient $\dot{p}_{K+G}$ of the accumulator pressure profile $p_S(t)$ during a measurement time interval $\Delta t_M$. The analysis unit 85 compares the pressure gradient $\dot{p}_{K+G}$ with a reference pressure gradient $p_{ref}$ and analyzes whether a fault-free or a faulty pressure decrease (i.e. a gear selector leak) is present in the accumulator pressure profile $p_S(t)$.

As shown in FIG. 2a, each of the gear selector valves 35 located in the gear selector paths 32 can be adjusted between a closed valve position S and two flow-through valve positions D1, D2. The gear selector path diagnosis is performed for each of the flow-through valve positions D1 and D2 separately in the gear selector path 32 to be tested. This means that in each gear selector path 32, the gear selector diagnosis is carried out both with the gear selector valve 38 in the first flow-through valve position D1 and with the gear selector valve 38 in the second flow-through valve position D2. In contrast, the gear selector valves 38 in the remaining gear selector paths 32 remain switched to the closed valve position S, in order to increase measuring accuracy in the diagnosis of the gear selector path 32 being tested. The pressure gradient $\dot{p}_{K+G}$ detected in the measurement time interval $\Delta t_M$ by the pressure sensor 34 therefore reflects the collective pressure decrease both in the reference clutch path 30 and in the gear selector path 32 being tested, the gear selector valve 38 of which is switched to one of the two flow-through positions D1, D2.

The reference pressure gradient $p_{ref}$ is read out from a characteristic map database, e.g. from the characteristic map database 83 already shown in FIG. 3. In this case, the readable reference pressure gradient $p_{ref}$ would correspond to a fault-free basic leakage of the reference clutch path 30. In the analysis unit 85, in addition to the detection of the pressure gradients $\dot{p}_{K+G}$, absolute pressure values are also detected, i.e. the actual accumulator pressure $pS(t_{start})$ at the start time $t_{start}$ and the actual accumulator pressure $p_S(t_{end})$ at the measurement end time $t_{end}$ of the measurement time interval $\Delta tM$. In this case, if the conditions are met that, first, there is a sufficiently large accumulator pressure difference between the start time $t_{start}$ and the end time $t_{end}$, and second, the pressure gradient $\dot{p}_{K+G}$ is equal to the reference pressure gradient $\dot{p}_{ref}$, the analysis unit 85 will diagnose a fault-free gear selector path 32.

Figure 6:
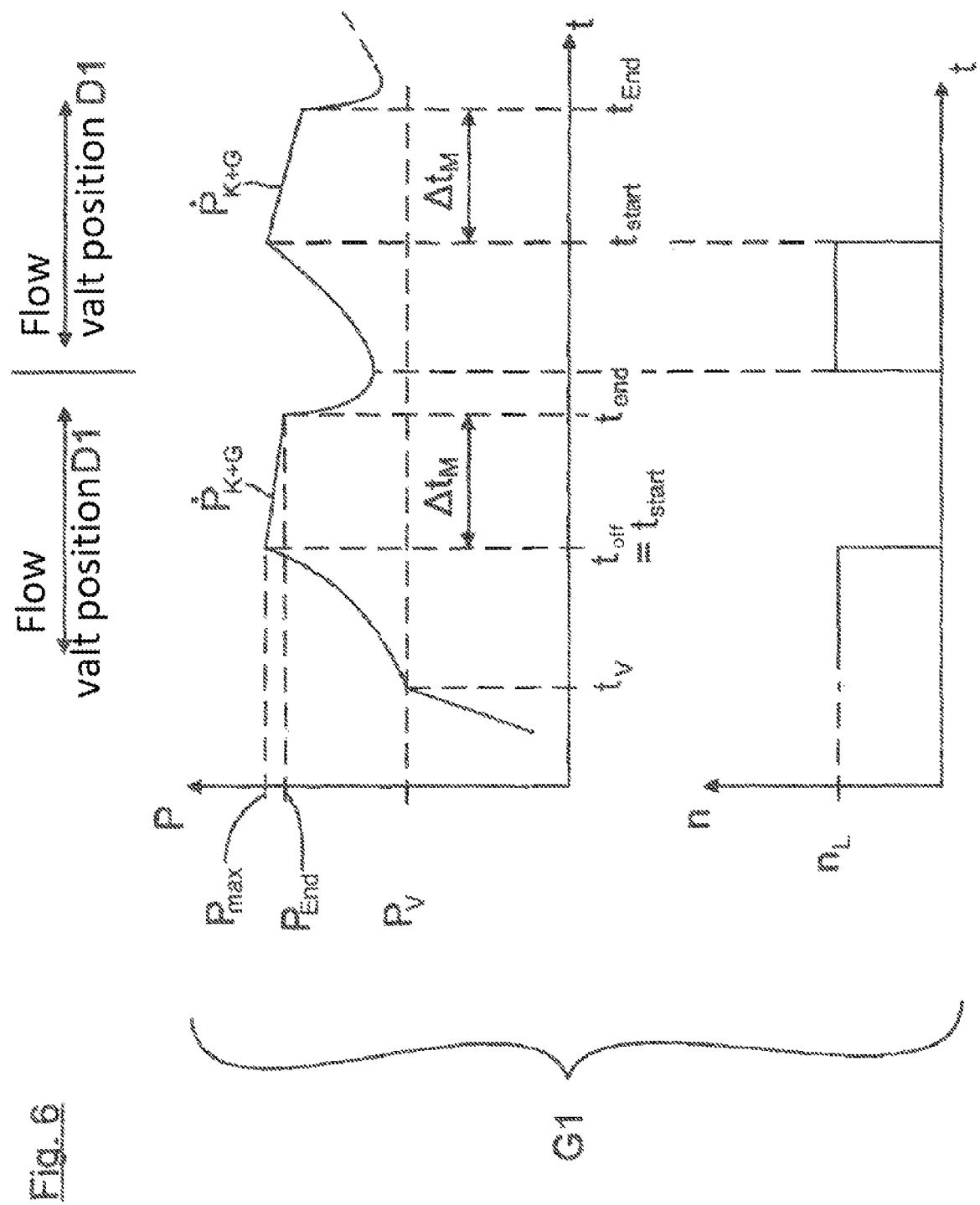
FIG. 6 contains graphs illustrating the gear selector path diagnosis.
Figure 7:
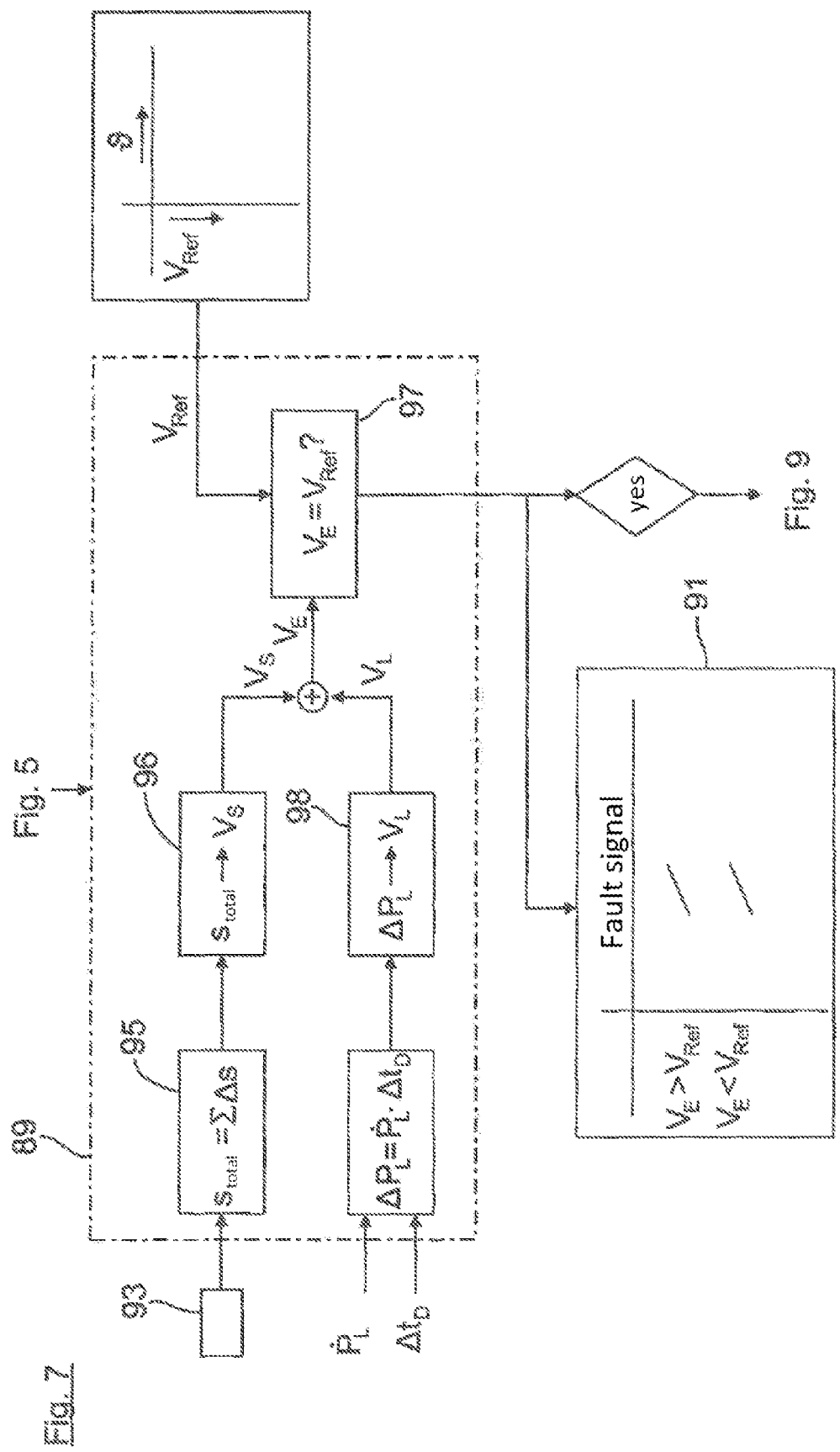
FIG. 7 is a block diagram showing the program blocks required for accumulator volume diagnosis in the diagnostic module.

FIG. 7 is a highly simplified block diagram showing the program blocks of the diagnostic module 79 that are required for an accumulator volume diagnosis. The accumulator volume diagnosis is performed as a follow-on diagnosis immediately following the gear selector diagnosis (FIGS. 5 and 6), under the condition that in the gear selector diagnosis, at least one gear selector path 32 of gear selectors G1 to G4 has been diagnosed as fault-free and can thus be used as a reference gear selector path in the accumulator volume diagnosis.

As is clear from FIG. 7, the diagnostic module 79 has an analysis unit 89 which, in a comparator block 97, compares a hydraulic fluid removal $V_E$ determined during the accumulator volume diagnosis with a reference accumulator volume $V_{ref}$. If a significant deviation is found, an accumulator volume fault is diagnosed, which is stored in the fault memory 91. The reference accumulator volume Vref can be read out from an accumulator volume characteristic map in a database, in which the reference values are stored on a temperature-dependent basis.

Figure 8:
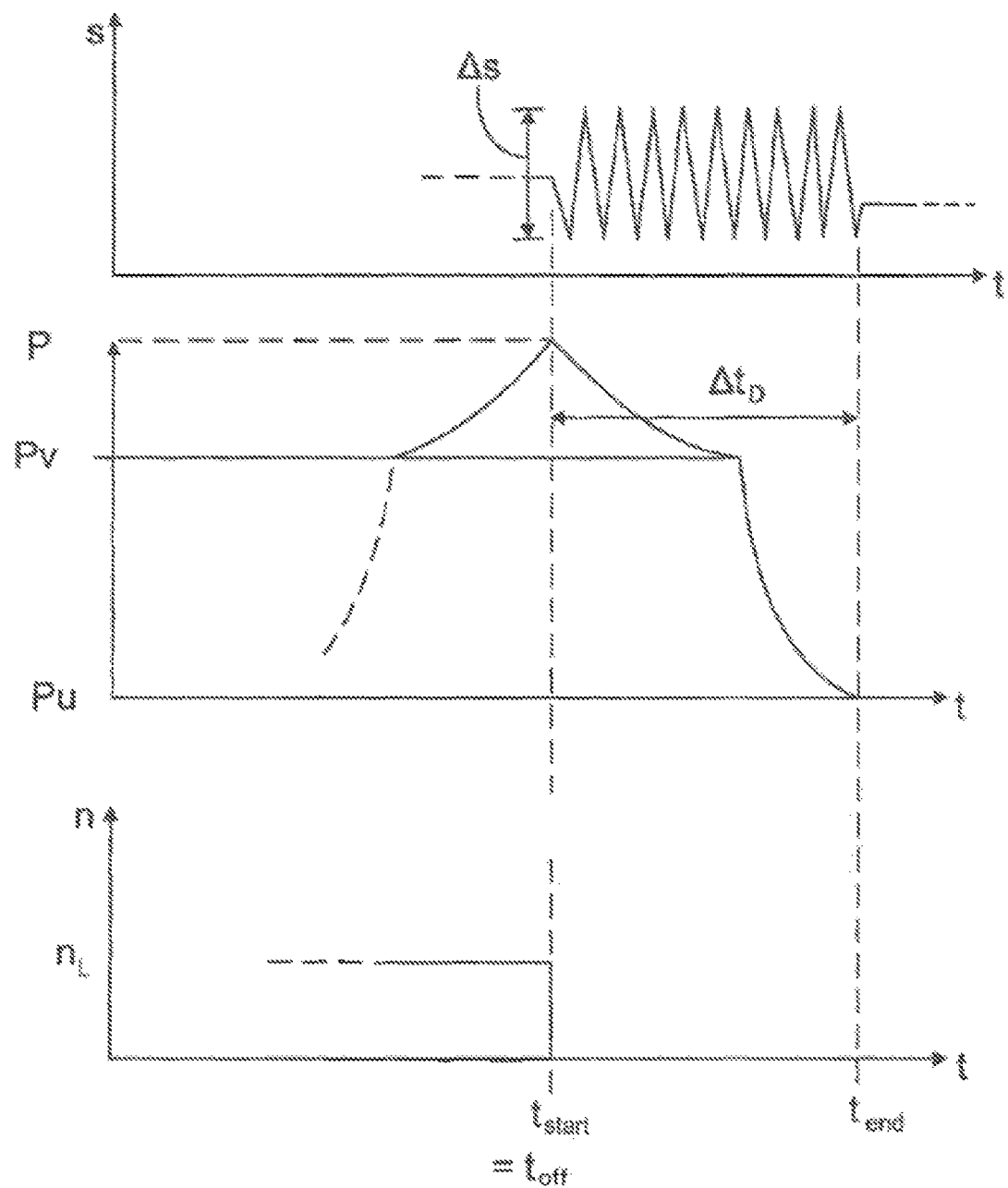
FIG. 8 contains graphs illustrating the accumulator volume diagnosis.

As is further clear from FIG. 7, the analysis unit 89 is in signal communication with a position sensor 93 of the gear selector hydraulic cylinder 22 located in the reference gear selector path 32. During the accumulator volume diagnosis, the gear selector valve 38 in the reference gear selector path 32 is actuated, and the position sensor 93 detects the travel distances $\Delta s$ of the gear selector hydraulic cylinder 22. These are integrated in a travel distance integrator 95 to obtain a total travel distance $s_{total}$. In a converter block 96, the total travel distance $s_{total}$ is converted to a total displacement volume $V_S$. To the total displacement volume $V_S$, a hydraulic fluid leakage volume $V_L$ that flows out during the accumulator volume diagnosis is added. The resulting hydraulic fluid removal $V_E$ is guided to the aforementioned comparator block 97. The accumulator volume diagnosis is performed as follows: In the storage volume diagnosis, the pressure accumulator is first filled completely with hydraulic fluid in a diagnostic charging operation. The diagnostic charging mode is a blind charging process which takes place for a certain amount of time t. The reference hydraulic cylinder 22 is then actuated intermittently within a diagnosis time interval $\Delta t_D$, beginning at a start time $t_{start}$ (which in FIG. 8 coincides with the switch-off time $t_{off}$) and continuing until, as a result of the leakage volume $V_L$ and the displacement volume $V_S$ removed from the hydraulic system, an ambient pressure $p_U$ is present in the hydraulic system. Rather than being measured via a pressure sensor, the ambient pressure $p_U$ is detected indirectly in the diagnostic module 79, specifically at the end time tend (FIG. 8) of the diagnosis time interval $\Delta t_D$, when, despite the flow-through valve position D1, D2 of the reference control valve 35, the position sensor 93 no longer detects any further travel distance $\Delta s$.

During the pressure accumulator volume diagnosis, one of the clutch paths 30, 31 as the reference clutch path, along with the reference gear selector path 32 that leads to the reference hydraulic cylinder 22, is pressurized with the accumulator pressure $p_S$ prevailing in the hydraulic system. In contrast, the hydraulic cylinders 22 of the other gear selector paths 32 and of the other clutch path are decoupled from the accumulator pressure $p_S$.

Figure 9:
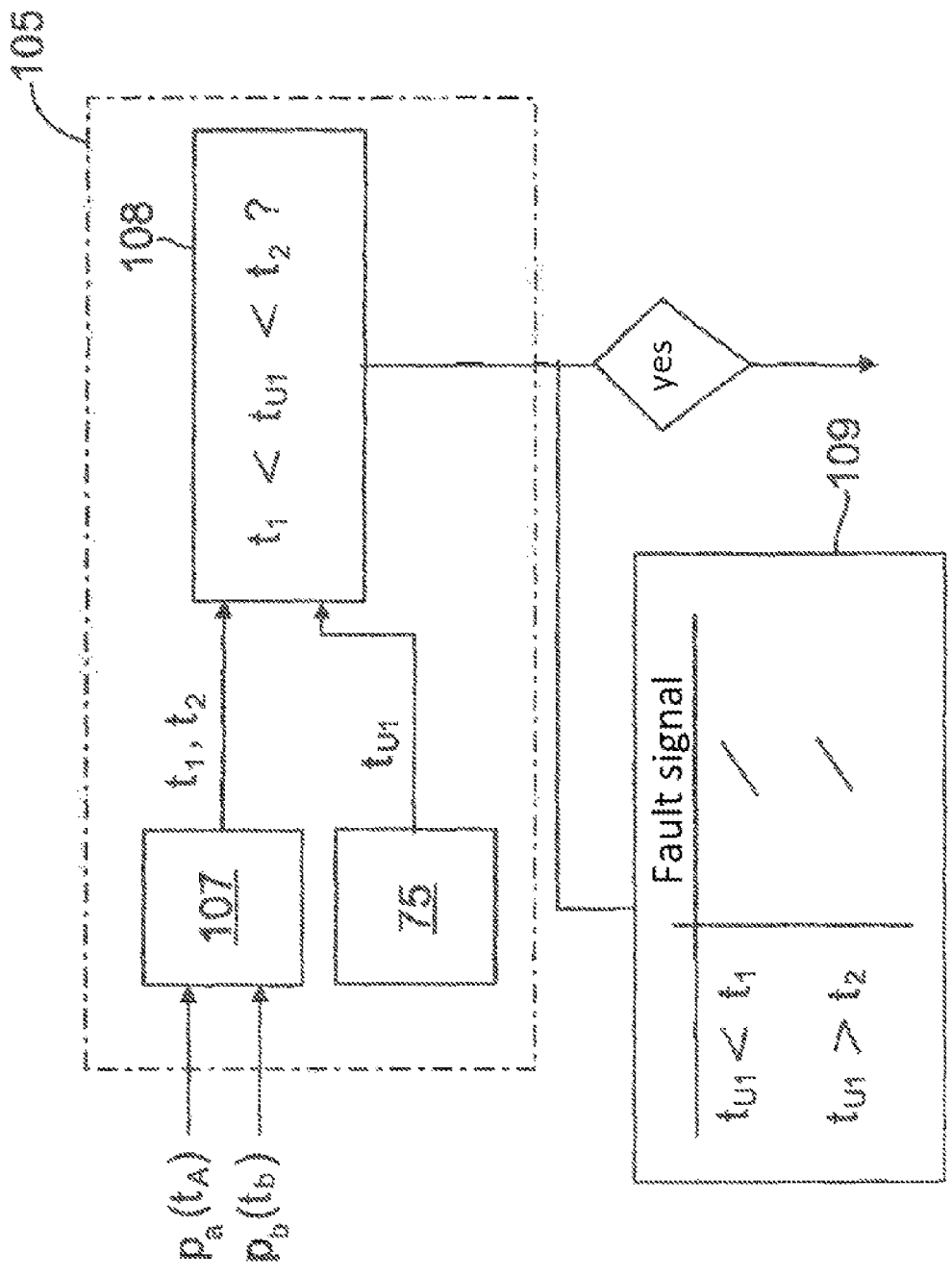
FIG. 9 is a block diagram showing the program blocks required for switchover timing diagnosis in the diagnostic module.

The leakage volume VL can be determined based upon the pressure gradients in the clutch path 30 and at the reference gear selector 22, detected during the preceding diagnoses (e.g. the pressure gradient $\dot{p}_{K+G}$ from the gear selector path diagnosis according to FIGS. 5 and 6). The resulting pressure difference $\Delta p_L$ is converted in a converter 98 to the leakage volume $V_L$. FIG. 9 is a highly simplified block diagram showing the program blocks of the diagnostic module 79 that are required for a switchover point diagnosis of the accumulator charging valve 71. The switchover timing diagnosis is performed as a follow-on diagnosis immediately following the accumulator volume diagnosis (FIGS. 7 and 8), under the condition that a plausible accumulator volume of the pressure accumulator 25 was diagnosed in the accumulator volume diagnosis.

As is clear from FIG. 9, the diagnostic module 79 has an analysis unit 105 with which, as part of the switchover timing diagnosis, a check is made to determine whether a first switchover time $t_U 1$, at which the accumulator charging valve 71 switches automatically from its charging position L to its non-charging position K, and a second switchover time $t_U 2$, at which the accumulator charging valve 71 switches automatically from its non-charging position K to its charging position, are plausible. For this purpose, the analysis unit 105 determines whether, at the first switchover time $t_U 1$, the actual accumulator pressure $p_S(t)$ is within range of the upper pressure threshold value $p_{max}$. In addition, the analysis unit 105 determines whether at the second switchover time tu2, the actual accumulator pressure $p_S(t)$ is within range of the lower pressure threshold value $p_{min}$.

For detecting the two switchover times $t_U 1$ and $t_U 2$, the current measuring device 75 of the electric motor 57 is used. The current measuring device 75 detects the actual current consumption I(t) of the electric motor 57. In this process, the time of a change from a high current consumption Imax to a low current consumption Imin is defined by the control unit 39 as the first switchover time $t_U1$. The time of a change from the low current consumption Imin to the high current consumption Imax is defined as the second switchover time $t_U2$.

The clutch path pressure sensor 34 is used to measure the actual storage pressure $p_S(t)$. In FIG. 11, its measuring range $\Delta p_{meas}$ of said sensor (FIG. 11) lies outside of, i.e. below the pressure threshold values $p_{max}$ and $p_{min}$. Thus, a detection of the actual accumulator pressure $p_S$ immediately at the two switchover times $t_U1$ and $t_U2$ is not possible because the actual accumulator pressure at the two switchover times lies outside of the measuring range $\Delta p_{meas}$. In FIG. 9, the actual accumulator pressure $p_S(t)$ is determined at the switchover times $t_U1$ and $t_U2$ by estimation, specifically with the aid of an extrapolation block 107. In the extrapolation block 107, based upon measured pressure values $p_a(t_a)$ and $p_b(tb)$ in the accumulator pressure profile that are within the pressure sensor measuring range ($\Delta p_{meas}$), a time frame $\Delta t_{target}$ is estimated. If the accumulator charging valve is operating properly, the first switchover time tU1 will lie within the time frame $\Delta t_{target}$. In FIGS. 9 and 11, the time frame $\Delta t_{target}$ is bounded by the two times $t_1$ and $t_2$. In the subsequent comparator block 108, it is determined whether the first switchover time $t_U1$ lies within or outside of the time frame $\Delta t_{target}$. If the first switchover time $t_U1$ lies outside of the time frame $\Delta t_{target}$, a fault will be diagnosed, which will be stored in the fault memory 109.

FIG. 9 shows only a partial diagnosis in the program blocks, in which a check is made to determine whether or not the first switchover time $t_U1$ lies within the time frame $\Delta t_{target}$. In the same manner, the analysis unit 105 checks to determine whether or not the second switchover time $t_U2$ lies within an estimated time frame.

Figure 10:
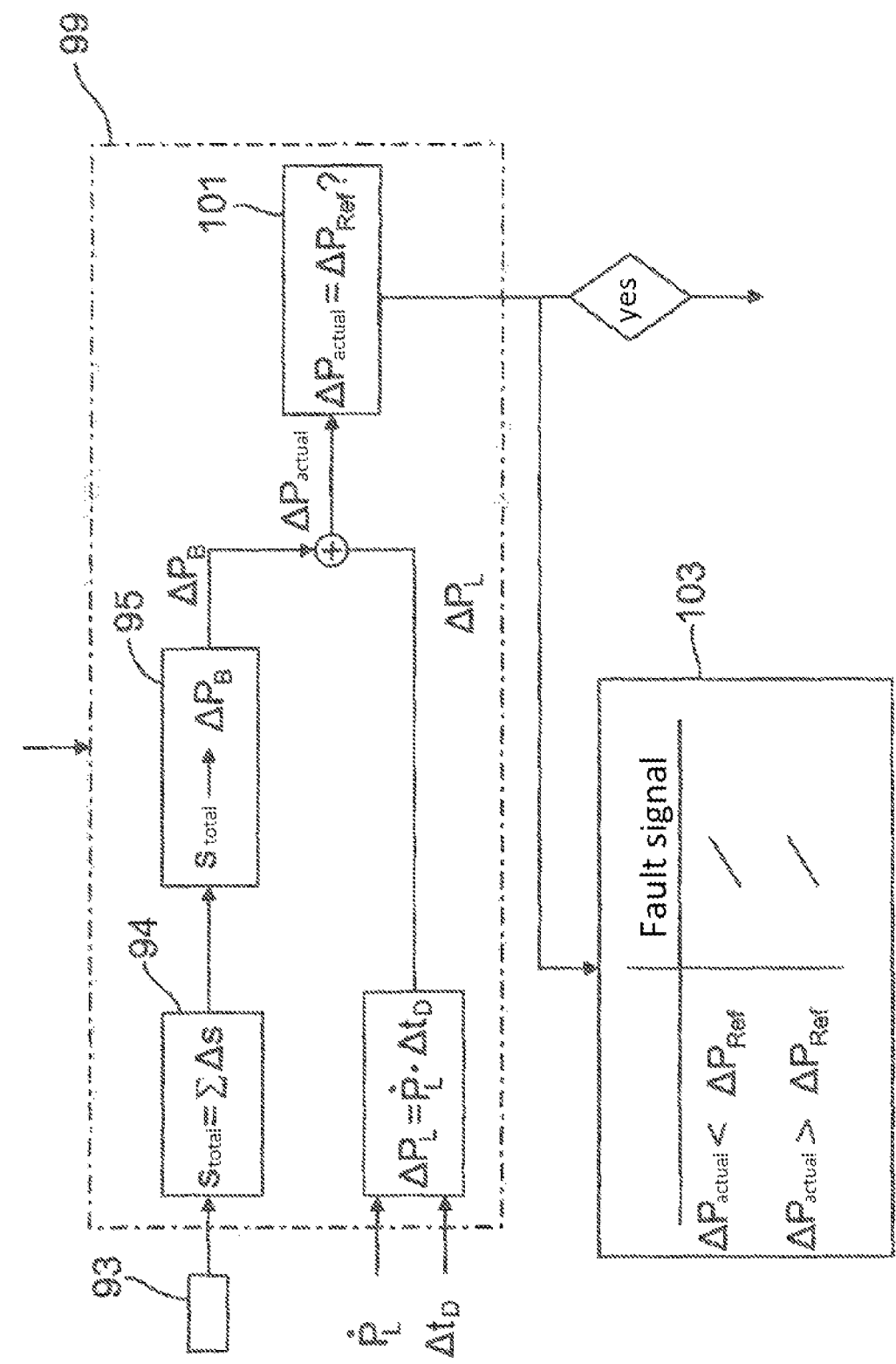
FIG. 10 is a block diagram showing the program blocks required for valve spread diagnosis in the diagnostic module;5

FIG. 10 is a highly simplified block diagram showing the program blocks of the diagnostic module 79 that are required for a valve spread diagnosis. The valve spread diagnosis is performed as a follow-on diagnosis immediately following the switchover timing diagnosis (FIG. 9) under the condition that at least one plausible switchover time $t_U1$ of the charging accumulator valve 71 has been identified in the switchover timing diagnosis.

In FIG. 10, the diagnostic module 79 has an analysis unit 99 which, in a valve spread diagnosis, determines the actual valve spread $\Delta p_{actual}$ between the lower pressure threshold value $p_{min}$ and the upper pressure threshold value $p_{max}$. A comparator block 101 of the analysis unit 99 compares the actual valve spread $\Delta p_{actual}$ with a target valve spread $\Delta p_{red}$. If a significant deviation is found, a fault is diagnosed and is stored in the fault memory 103.

To determine the actual valve spread $\Delta p_{actual}$, the analysis unit 99 defines a diagnosis time interval $\Delta t_D$. The diagnosis time interval $\Delta t_D$ begins at the first switchover time $t_U1$ and ends at the subsequent second switchover time $t_U2$. Within the above-defined diagnosis time interval $\Delta t_D$, the diagnostic module 79 activates a reference hydraulic cylinder 22, which according to FIG. 11 is switched back and forth constantly, i.e. intermittently, during the diagnosis time interval $\Delta t_D$. Due to the actuation of the reference hydraulic cylinder 22 and due to a system-inherent hydraulic system leakage, an accumulator pressure decrease $\Delta P_E$ that corresponds to the actual valve spread $\Delta p_{actual}$ occurs during the diagnosis time interval $\Delta t_D$.

The accumulator pressure decrease $\Delta P_E$, i.e. the actual valve spread $\Delta p_{actual}$, is determined using the program blocks shown in FIG. 10, as follows: From the position sensor 93, the piston travel distances $\Delta s$ are integrated in an integrator 94 during the diagnosis time interval $\Delta t_D$ to obtain a total travel distance stotal. This is then used in a converter block 95 to calculate the pressure decrease $\Delta P_B$ associated with the gear selector actuation. The pressure decrease $\Delta p_B$ associated with the gear selector actuation is added in a summation element to the leakage-induced pressure decrease $\Delta p_L$, which gives the accumulator pressure decrease $\Delta p_E$ during the diagnosis time interval $\Delta t_D$.

The leakage-induced pressure decrease $\Delta p_L$ in the reference hydraulic cylinder 22 has already been determined in previous diagnoses.

As shown in FIG. 2a, connected upstream of the two clutch paths 30, 31 is a safety valve 28 which can be controlled by the electronic control unit 39 The safety valve 28 can be actuated between a closed position and a flow-through position. In the closed position, the two clutch paths 30, 31 are pressure-decoupled from the pressure accumulator 25. In the flow-through position, the two clutch paths 30, 31 can be pressurized with the accumulator pressure $p_s$. If the control unit 39 detects a malfunctioning of the clutch valve 35 in at least one of the clutch paths 30, 31, the safety valve 28 can be adjusted to its closed position for safety reasons. During normal driving operation, the safety valve 28 is constantly in its flow-through position.

Figure 12:
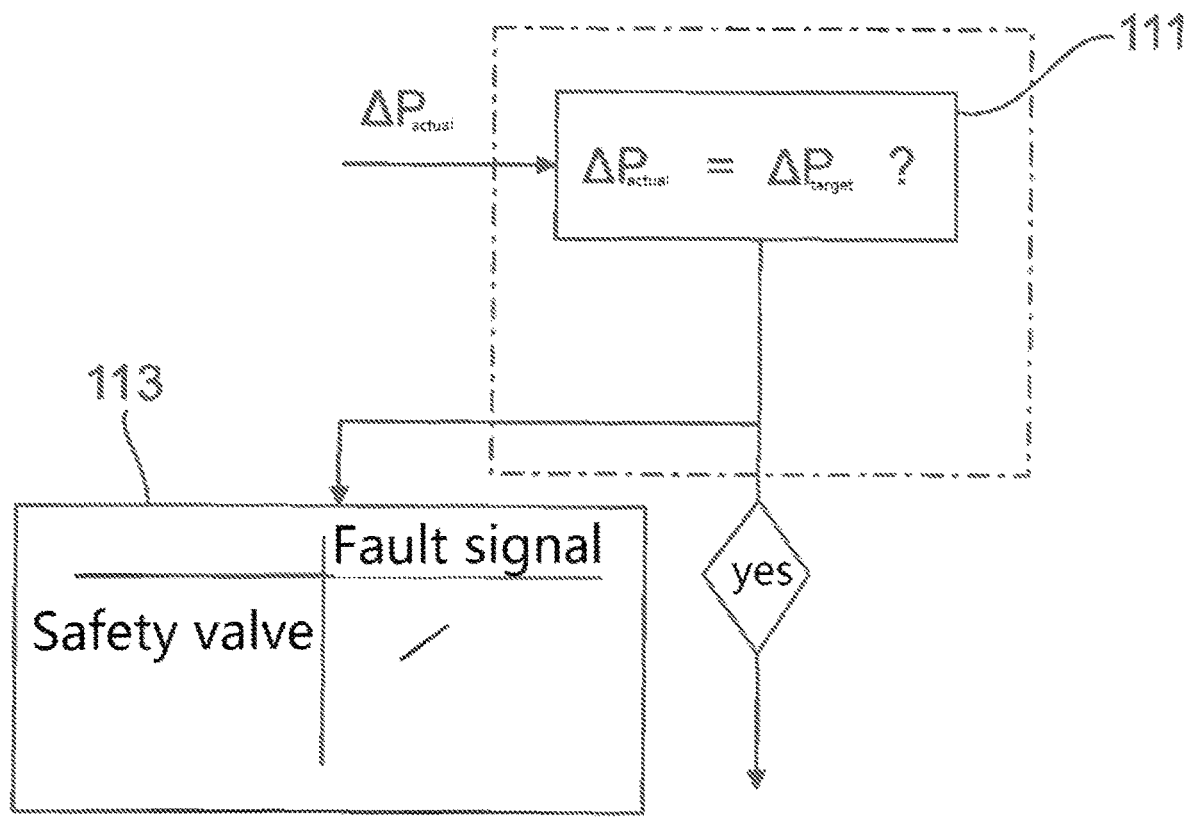
FIG. 12 is a block diagram showing the program blocks required for safety valve diagnosis in the diagnostic module.

FIG. 12 is a simplified block diagram showing the program blocks of the diagnostic module 79 that are required for a safety valve diagnosis. The safety valve diagnosis can be performed independently of other diagnostic steps. During the safety valve diagnosis, the safety valve 28 is switched from the flow-through position to the closed position at a diagnosis start time $t_{start}$ (FIG. 13), thereby creating an actual pressure decrease $\Delta p_{actual}$ downstream of the safety valve 28. The diagnostic module 79 has an analysis unit 111 which compares this actual pressure decrease $\Delta p_{actual}$ with a target pressure decrease $\Delta p_{target}$. If a significant deviation is found, a fault is diagnosed and stored in a safety fault memory 113.

The aforementioned clutch pressure sensor 34 can be used to detect the actual pressure decrease $\Delta p_{actual}$.

Figure 13:
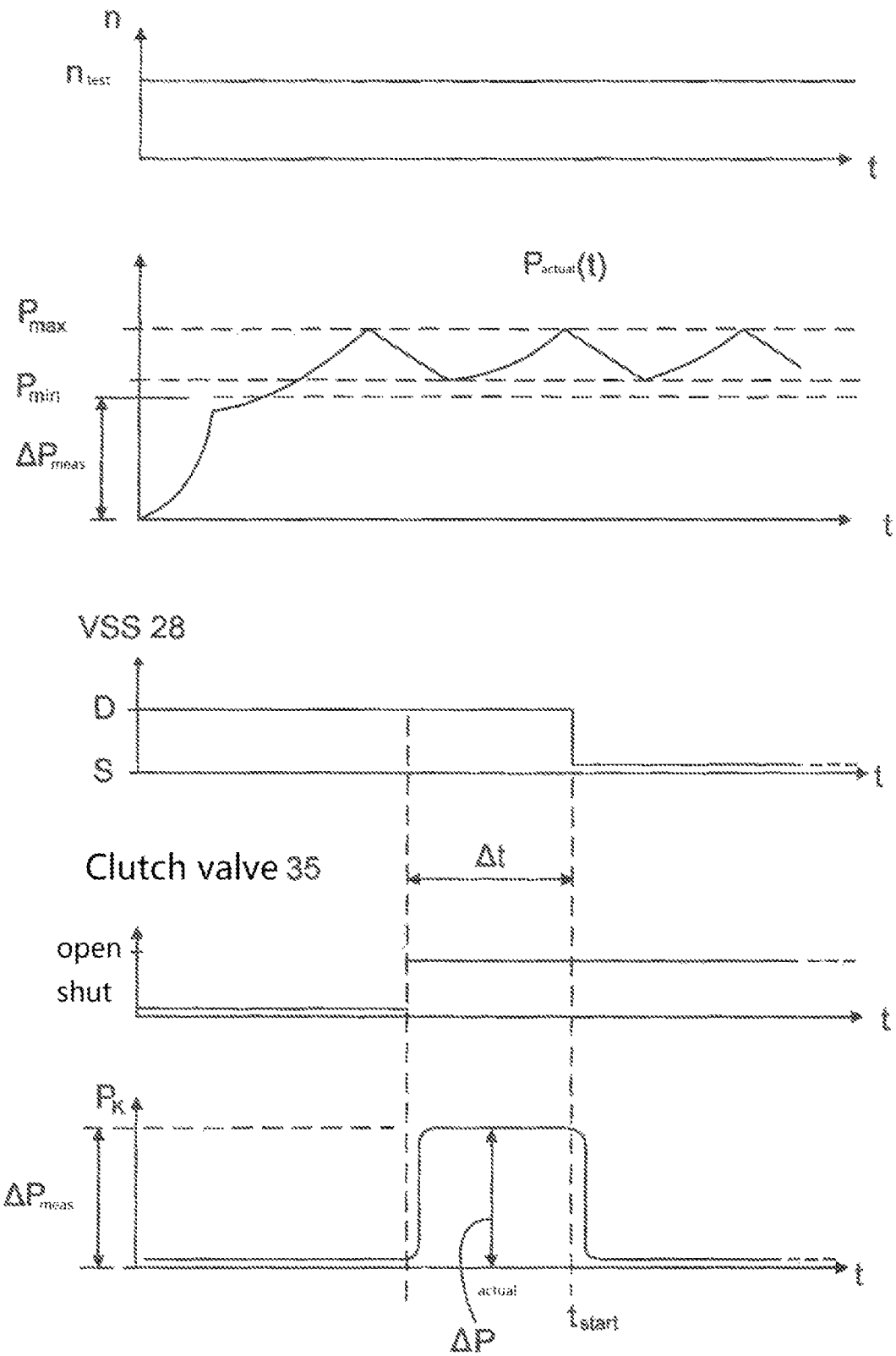
FIG. 13 contains graphs illustrating the profiles over time of relevant parameters during safety valve diagnosis.

In the following, the performance of the safety valve diagnosis will be described in reference to FIGS. 12 and 13: For proper measuring accuracy, the hydraulic pump 53 is activated to a constant speed $nt_{est}$ to ensure that there is sufficient accumulator pressure pS in the high-pressure circuit H, which according to FIG. 13 moves between the upper pressure threshold value $p_{max}$ and the lower pressure threshold value $p_{min}$. The clutch valve 35 of a reference clutch path 30 or 31 is adjusted to its flow-through position prior to the aforementioned start time $t_{start}$ by a time difference $\Delta t$, so that the pressure sensor 34 between the clutch valve 35 and the clutch hydraulic cylinder 23 can detect the actual pressure decrease $\Delta p_{actual}$. During the time difference $\Delta t$, rather than reading out the hydraulic pressure actually present at the clutch hydraulic cylinder 22 to the analysis unit 111 (FIG. 12), the pressure sensor 34 reads out an upper limiting pressure of the measuring range $\Delta p_{meas}$.

At the diagnostic start time $t_{start}$, the safety valve 28 is switched from its flow position D to its closed position S. The resulting pressure decrease $p_{actual}$ is detected by the pressure sensor 34 and is compared in the analysis unit 111 with the target pressure decrease.

Figure 14:
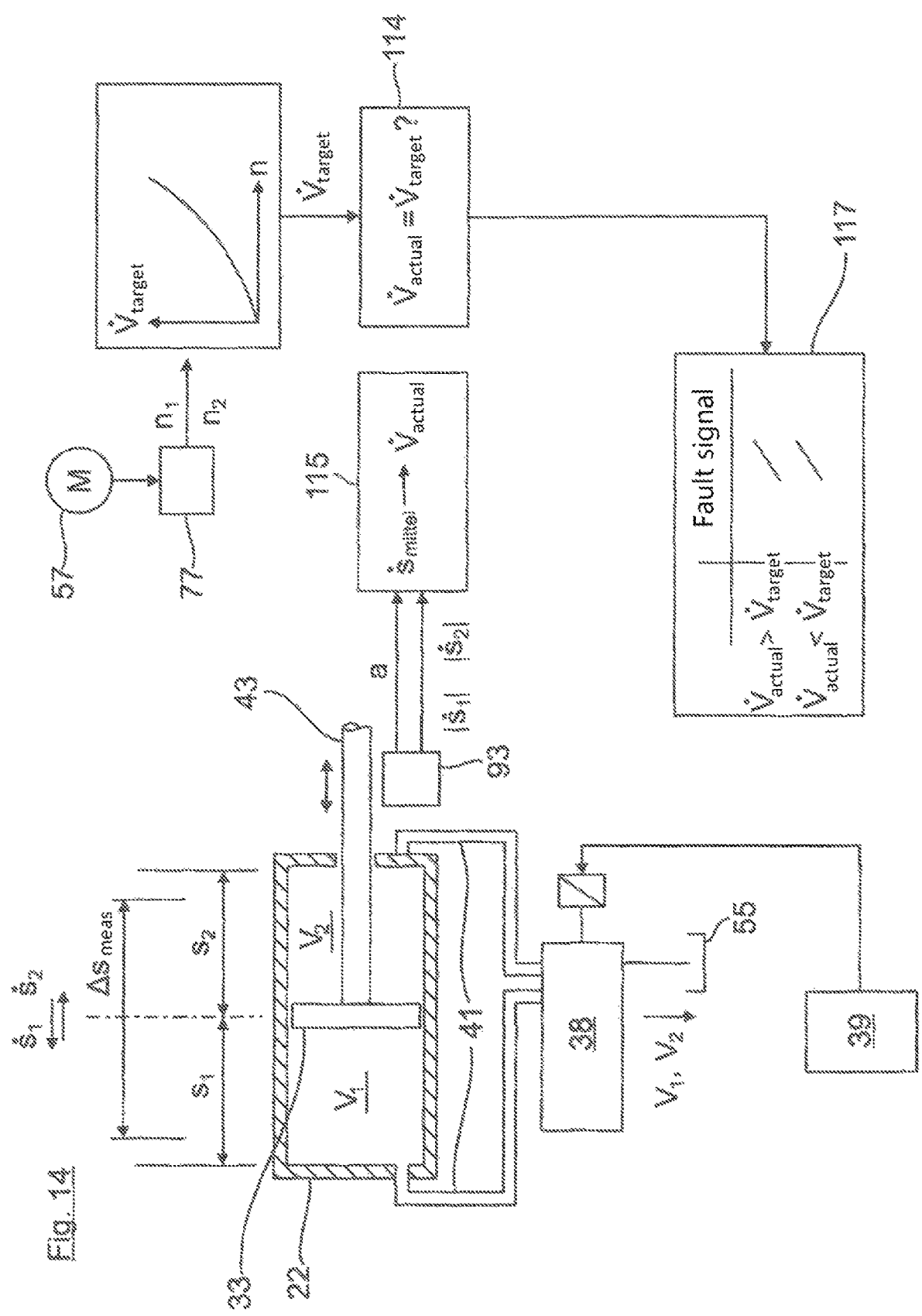
FIG. 14 is a block diagram showing the program blocks required for switchover timing diagnosis in the diagnostic module.

FIG. 14 is a highly simplified block diagram showing the program blocks of the diagnostic module 79 that are required for the delivery volume flow diagnosis. The delivery volume flow diagnosis is performed as a follow-on diagnosis immediately following the accumulator volume diagnosis (FIGS. 7 and 8), under the condition that a plausible accumulator volume of the pressure accumulator 25 is detected in the accumulator volume diagnosis.

As is clear from FIG. 14, a gear selector hydraulic cylinder 22, which is connected to the pressure sensor 25 via the gear selector 32, is used for the diagnosis. Upstream of the gear selector hydraulic cylinder 22 is a gear selector valve 38, which can be actuated by the control unit 39 to adjust the hydraulic pressure applied to the gear selector hydraulic cylinder 22. The gear selector valve 38 can be adjusted between two flow-through positions D1, D2 in order to displace a piston 33 in opposing piston strokes over the indicated travel distances s1, s2 and at piston speeds s1, s2 in the hydraulic actuating cylinder 22. In FIG. 14, the piston 33 divides the hydraulic cylinder into a piston rod-side working chamber and a working chamber opposite the first, the two of which are connected via hydraulic control lines 41 to the gear selector valve 38. A gear selector G1, not shown, can be actuated by means of the piston rod 43 of the gear selector hydraulic cylinder 22. With such a gear selector actuation, the electronic control unit 39 controls the gear selector valve 38 in a known manner into one of the flow-through positions D1, D2, in order to move the piston rod. The piston stroke is connected to a hydraulic fluid removal Vi, V2 (displacement volume) from the hydraulic system. Because the internal geometry of the gear selector hydraulic cylinder 22 is known, the respective displacement volume $V_1$, $V_2$ is known. Also provided is a position sensor 93, with which the piston speed $\dot{s}_1$, $\dot{s}_2$ in the respective piston stroke can be detected.

Figure 15:
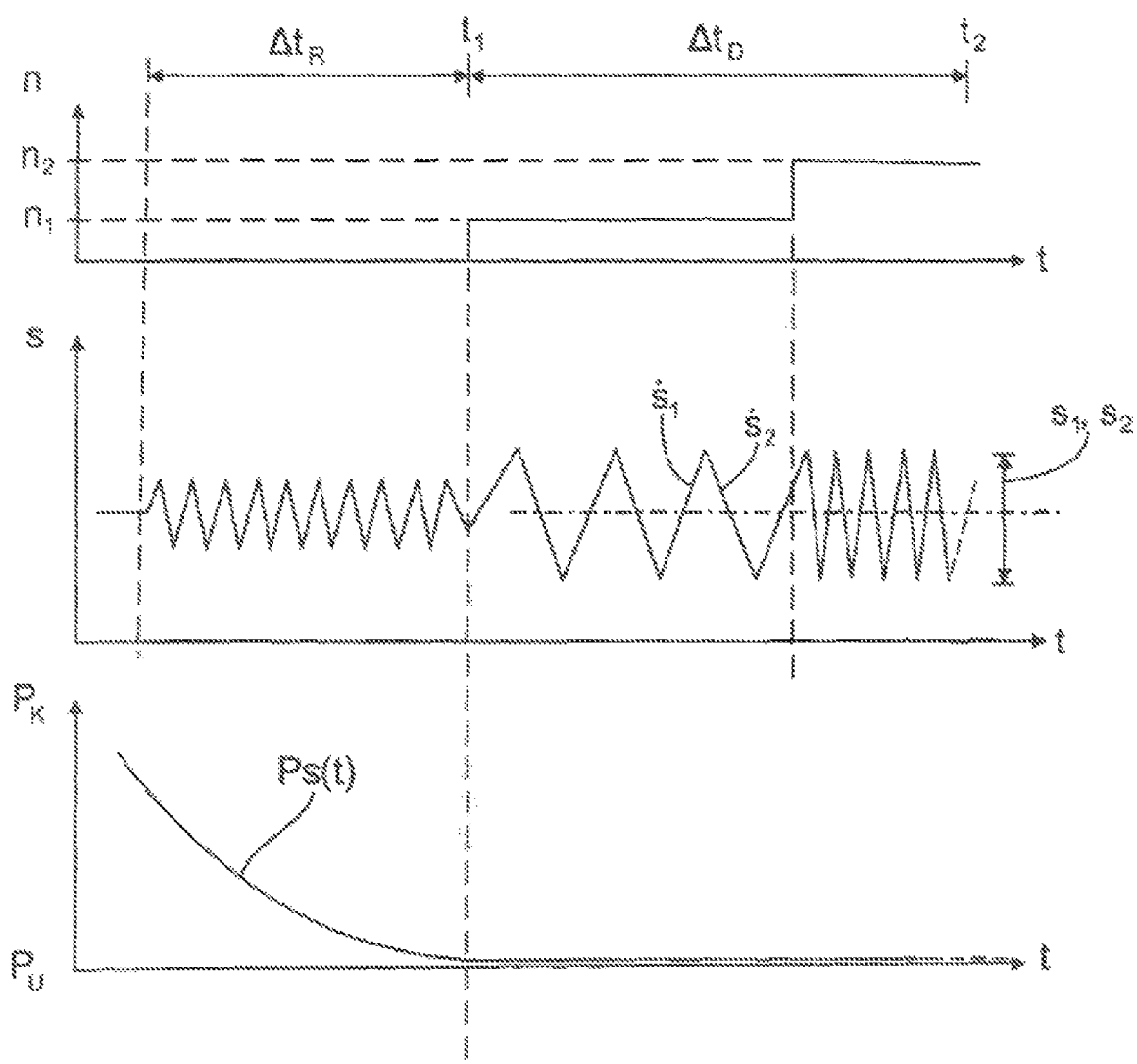
FIG. 15 contains graphs illustrating the profiles over time during delivery volume flow diagnosis.

FIGS. 14 and 15 describe the flow rate diagnosis below: First, the hydraulic pump 53 is first deactivated within a pressure reduction time interval $\Delta t_R$ (FIG. 15), while at the same time, the gear selector valve 38 is actuated intermittently by the electronic control unit 39, as shown in the middle travel distance graph of FIG. 15. During the pressure reduction time interval $\Delta t_R$, the gear selector valve 38 is actuated so as to move the gear selector hydraulic cylinder 22 back and forth until, as a result of leakage-induced hydraulic fluid removal and as a result of actuation-induced hydraulic fluid removal (i.e., displacements $V_1$, $V_2$), the accumulator pressure $p_S(t)$ is reduced to the ambient pressure $p_U$. In this state, the accumulator 25 has been completely drained. This is followed immediately by the start ($t_{start}$) of a diagnosis time interval $\Delta t_D$. During the diagnosis time interval $\Delta t_D$ a charging operation of the hydraulic pump 53 is carried out, in which the pump is actuated at different test speeds $n_1$ and $n_2$. At the same time, the control valve 35 is adjusted intermittently between its flow-through positions $D_1$, $D_2$. This causes the piston 33 in the gear selector hydraulic cylinder 22 to move back and forth in the gear actuator hydraulic cylinder 22 in opposing piston strokes over piston travel distances $s_1$, $s_2$ and at piston speeds $\dot{s}_1$, $\dot{s}_2$.

The position sensor 93 detects both the individual travel distances $s_1$, $s_2$ per piston stroke and the piston speeds $\dot{s}_1$, $\dot{s}_2$ per piston stroke. In addition, the number a (FIG. 14) of piston strokes during the diagnosis time interval $\Delta t_D$ is detected. These data are forwarded to the signal input of a converter block 115, in which an average piston speed $\dot{s}_{average}$ is calculated from the number a of detected piston strokes. From the average piston speed $\dot{s}_{average}$, an actual delivery volume flow $V_{actual}$ is calculated in the converter block 115. In an analysis unit 113 which is connected in terms of signal communication downstream, the actual delivery volume flow $V_{actual}$ is compared with a target delivery volume flow $V_{target}$, factoring in the respective test speed $n_1$ and $n_2$ during the diagnosis time interval $\Delta t_D$. If a significant deviation is detected in the analysis unit 113, a fault is detected, which is stored in the fault memory 117.

Figure 16:
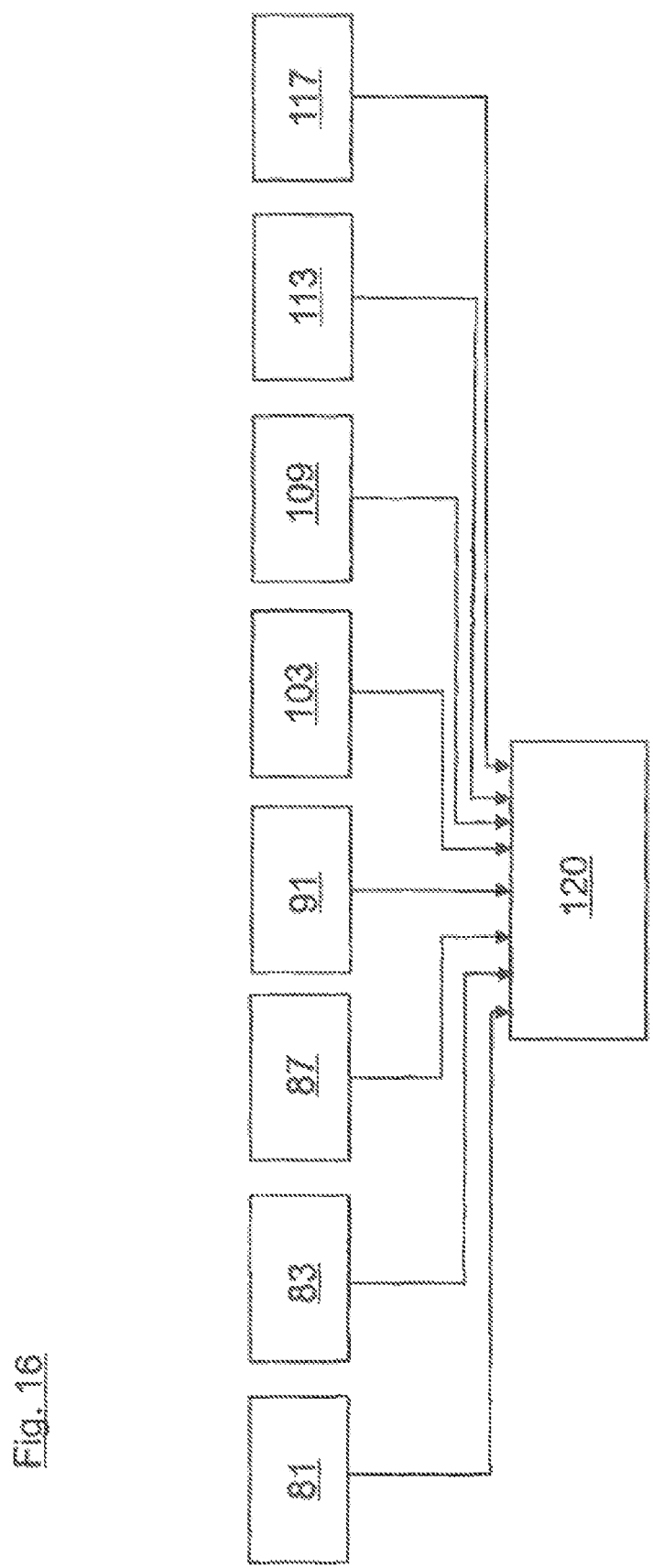
FIG. 16 shows an analysis unit into which the fault signals generated in the fault memories can be read.

As is clear from FIG. 16, all of the fault memories 81, 83, 87, 91, 103, 109, 117 are in signal communication with an analysis unit 120, into which the fault signals generated in the fault memories can be read. In the analysis unit 120, an analysis matrix is stored, in which the fault signals from the fault memories 81, 83, 87, 91, 103, 109, 117 are merged.

For a comprehensive hydraulic system diagnosis, the analysis unit 120 uses the analysis matrix to analyze all the fault signals in combination. Thus in the analysis unit 120, a comparison of fault signals with acceptable, i.e. fault-free, functional diagnoses is finally performed, thereby enabling a qualified appraisal of the components installed in the hydraulic system. This appraisal is possible without dismantling of the hydraulic system and without external testing equipment/measuring technology. By testing components in the installed state (in the vehicle), a shortening of repair and maintenance times, a reliable detection of defective components, a decrease in repairs that must be repeated, and a savings on analysis test bench capacities are possible without the effort associated with dismantling.

The invention claimed is:

1. A hydraulic system for an automatic transmission comprising:
   a high-pressure circuit, in which a pressure accumulator, at least one clutch, and gear selectors are connected,
   a low-pressure circuit for cooling the at least one clutch, wherein the high-pressure circuit and the low-pressure circuit have at least one hydraulic pump, which is driven by an electric motor, and
   a control unit, which activates the electric motor of the at least one hydraulic pump when a requirement to charge the pressure accumulator is identified,
   wherein the high-pressure and low-pressure circuits are connected via a bypass line to an integrated accumulator charging valve, which in a non-charging position fluidically connects the at least one hydraulic pump to the low-pressure circuit and in a charging position fluidically connects the at least one hydraulic pump to the high-pressure circuit, wherein the accumulator charging valve switches automatically from the charging position to the non-charging position at a first switchover time if the accumulator pressure in the high-pressure circuit exceeds an upper pressure threshold value, and switches automatically from the non-charging position to the charging position at a second switchover time if the accumulator pressure drops below a lower pressure threshold value, characterized in that the control unit has a diagnostic module which performs a valve spread diagnosis, in which an actual valve spread between the lower and upper pressure threshold values is determined, and in that the diagnostic module has an analysis unit, which compares the actual valve spread with a target valve spread and, if a deviation is found, diagnoses a fault, which is stored in a valve spread fault memory.

2. The hydraulic system according to claim 1, wherein a coupling valve, which is actuated by the control unit, is arranged in at least one coupling path extending from the pressure accumulator to the coupling hydraulic cylinder and which sets a hydraulic pressure applied to the coupling hydraulic cylinder, and in that the electronic control unit is assigned a pressure sensor which detects the hydraulic pressure applied to the coupling hydraulic cylinder.

3. The hydraulic system according to claim 2, wherein the pressure sensor is used to detect the actual accumulator pressure during the switchover timing diagnosis.

4. The hydraulic system according to claim 3, wherein a measuring range of the pressure sensor lies outside of the upper pressure threshold value, and in that, on the basis of measured pressure values that lie within the pressure sensor measuring range, an analysis unit estimates a time frame within which, the first switchover time will lie if the valve is functioning properly, and in that if the first switchover time lies outside of this time frame, a fault is diagnosed, which is stored in a fault memory.

5. The hydraulic system according to claim 1, wherein the diagnostic module performs a valve spread diagnosis as a follow-on diagnosis after a fault-free changeover time diagnosis, and in that, with the valve spread diagnosis, an actual valve spread between the lower and upper pressure threshold value is detected, and in that the diagnostic module has an evaluation unit, which compares the actual valve spread with a target valve spread and, in case of the deviation, diagnoses a fault, which is stored in a valve spread fault memory.

6. The hydraulic system according to claim 5, wherein to determine the actual valve spread, the analysis unit specifies a diagnosis time interval, which begins at the first switchover time and ends at the second switchover time, and in that during the diagnosis time interval, an accumulator pressure decrease that corresponds to the actual valve spread occurs, both as a result of actuation of a reference hydraulic cylinder and as a result of hydraulic system leakage.

7. The hydraulic system according to claim 6, wherein for determining the accumulator pressure decrease during the diagnosis time interval, the reference hydraulic cylinder has a position sensor, which detects the piston travel distances occurring with gear selector actuations, and in that during the diagnosis time interval the diagnostic module integrates the piston travel distances to obtain a total travel distance, which the diagnostic module then uses to calculate the pressure decrease associated with the gear selector actuations, and in that from the sum of the pressure decrease associated with the gear selector actuations and the leakage-induced pressure decrease, the analysis unit determines the accumulator pressure decrease.

8. The hydraulic system according to claim 5, wherein when the accumulator charging valve is in the charging position, the at least one hydraulic pump operates at a first pump load and a first current consumption, and when the accumulator charging valve is in the non-charging position, the at least one hydraulic pump operates at a second pump load which is lower than the first pump load, and a second current consumption which is lower than the first current consumption.

9. The hydraulic system according to claim 8, wherein the control unit is assigned a current measuring device which detects the actual current consumption of the electric motor, and in that the control unit identifies the time of the change from the first current consumption to the second current consumption as the first switchover time and identifies the time of the change from the second current consumption to the second current consumption as the second switchover time.

10. The hydraulic system according to claim 1, wherein the reference hydraulic cylinder is a gear selector hydraulic cylinder, and in that in a reference gear selector path leading from the pressure accumulator to the reference hydraulic cylinder, a gear selector valve is arranged, which is controlled by the control unit and with which the rate of flow through the reference hydraulic cylinder is adjusted.

11. The hydraulic system according to claim 1, wherein in the components that are pressurized with the accumulator pressure during the diagnosis time interval, a leakage-induced pressure decrease occurs.

12. The hydraulic system according to claim 1, wherein the switchover timing diagnosis is performed as a follow-on diagnosis following an accumulator volume diagnosis and a gear selector path diagnosis.

13. The hydraulic system according to claim 12, wherein the diagnostic module performs an accumulator volume diagnosis, in which an analysis unit of the diagnostic module compares the actual accumulator volume of the pressure accumulator with a reference accumulator volume of the pressure accumulator and if the deviation is found, diagnoses a fault, which is stored in an accumulator volume fault memory.

* * * * *